US012754706B2

(12) United States Patent
Wang et al.

(10) Patent No.: US 12,754,706 B2
(45) Date of Patent: Oct. 6, 2026

(54) FILE PROCESSING METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Dingxuan Wang, Dongguan (CN); Jun Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/182,153

(22) Filed: Apr. 17, 2025

(65) Prior Publication Data

US 2025/0251893 A1 Aug. 7, 2025

Related U.S. Application Data

(63) Continuation of application No. PCT/CN2023/117309, filed on Sep. 6, 2023.

(30) Foreign Application Priority Data

Oct. 17, 2022 (CN) ......................... 202211269021.4

(51) Int. Cl.
*G06F 3/14* (2006.01)
*G06F 1/16* (2006.01)
(Continued)

(52) U.S. Cl.
CPC .......... *G06F 3/1431* (2013.01); *G06F 1/1652* (2013.01); *G06F 3/0486* (2013.01); *H04L 51/08* (2013.01)

(58) Field of Classification Search
CPC .... G06F 3/1431; G06F 1/1652; G06F 3/0486; H04L 51/08
See application file for complete search history.

(56) References Cited

U.S. PATENT DOCUMENTS 11,838,435 B2 * 12/2023 Kim .................... H04M 1/0245
2020/0326900 A1 * 10/2020 Kwon .................. G06F 1/1681
(Continued)

FOREIGN PATENT DOCUMENTS

CN 107688370 A 2/2018
CN 109582477 A 4/2019
(Continued)

OTHER PUBLICATIONS

WIPO, Written Opinion and International Search Report for PCT Application No. PCT/CN2023/117309 mailed on Nov. 23, 2023.
(Continued)

*Primary Examiner* — Lixi C Simpson
(74) *Attorney, Agent, or Firm* — Sheppard, Mullin, Richter & Hampton LLP

(57) ABSTRACT

Provided are a file processing method, an electronic device, and a storage medium. In the method, a first interface of a first application is displayed in a first display area, the first interface including file content of a first file. In response to a first control operation, a file identifier of the first file is displayed in a second interface displayed in a second display area. In response to a first operation performed on the file identifier in the second interface, processing corresponding to the first operation is performed on the first file.

20 Claims, 19 Drawing Sheets

(51) Int. Cl.
*G06F 3/0486* (2013.01)
*H04L 51/08* (2022.01)

(56) References Cited

U.S. PATENT DOCUMENTS

| | | | | |
|---|---|---|---|---|
| 2021/0216332 | A1* | 7/2021 | Li | G06F 1/1641 |
| 2022/0311718 | A1* | 9/2022 | Hasuike | H04L 51/046 |
| 2023/0176721 | A1* | 6/2023 | Chung | G06F 1/1641 345/173 |

FOREIGN PATENT DOCUMENTS

| | | | | |
|---|---|---|---|---|
| CN | 109782976 | A | 5/2019 | |
| CN | 110069456 | A | 7/2019 | |
| CN | 113557491 | A | 10/2021 | |
| CN | 114518819 | A | 5/2022 | |
| EP | 3279763 | A1 * | 2/2018 | H04M 1/0268 |
| KR | 20220015266 | A | 2/2022 | |

OTHER PUBLICATIONS

CNIPA, First Office Action for CN Application No. 202211269021.4 mailed on May 8, 2026.

* cited by examiner

FILE PROCESSING METHOD, ELECTRONIC DEVICE, AND STORAGE MEDIUM

CROSS-REFERENCE OF RELATED APPLICATION

This application is a continuation of International Application No. PCT/CN2023/117309 filed Sep. 6, 2023, which claims priority to Chinese Patent Application No. 202211269021.4, filed Oct. 17, 2022. The entire contents of them are hereby incorporated by reference for all purposes.

TECHNICAL FIELD

The present disclosure relates to the technical field of electronic devices, and particularly to a file processing method, an electronic equipment and a storage medium.

BACKGROUND

With the rapid advancement of science and technology as well as living standards, electronic devices (such as smart phones, and tablet computers) have become one of the commonly used electronic products in people's lives. At present, the electronic devices support more and more functions, and the users may usually use the electronic devices to edit and view the content of files, for example.

SUMMARY

Embodiments of the present disclosure propose a file processing method, an electronic device and a storage medium.

In a first aspect, the embodiments of the present disclosure provide a file processing method for an electronic device, the electronic device including a screen. In the method, a first interface of a first application is displayed in a first display area of the screen, the first interface including file content of a first file. In response to a first control operation, a file identifier of the first file is displayed in a second interface displayed in a second display area of the screen, the second interface being an interface of a second application. In response to a first operation performed on the file identifier in the second interface, processing corresponding to the first operation is performed on the first file.

In a second aspect, the embodiments of the present disclosure provide an electronic device. The electronic device includes one or more processors, a memory, and one or more programs. The one or more programs are stored in the memory and configured to be executed by the one or more processors, and the one or more programs are configured to implement the file processing method provided in the first aspect.

In a third aspect, the embodiments of the present disclosure provide a non-transitory computer-readable storage medium having program codes stored thereon. The program codes are invokable by a processor to implement the file processing method provided in the first aspect.

BRIEF DESCRIPTION OF THE DRAWINGS

In order to more clearly illustrate technical solutions in the embodiments of the present disclosure, the drawings required for use in the description of the embodiments will be briefly introduced below. Apparently, the drawings described below are only some embodiments of the present disclosure. For those skilled in the art, other drawings may be obtained based on these drawings without paying any creative work.

DETAILED DESCRIPTION OF PREFERRED EMBODIMENTS

Figure 1:
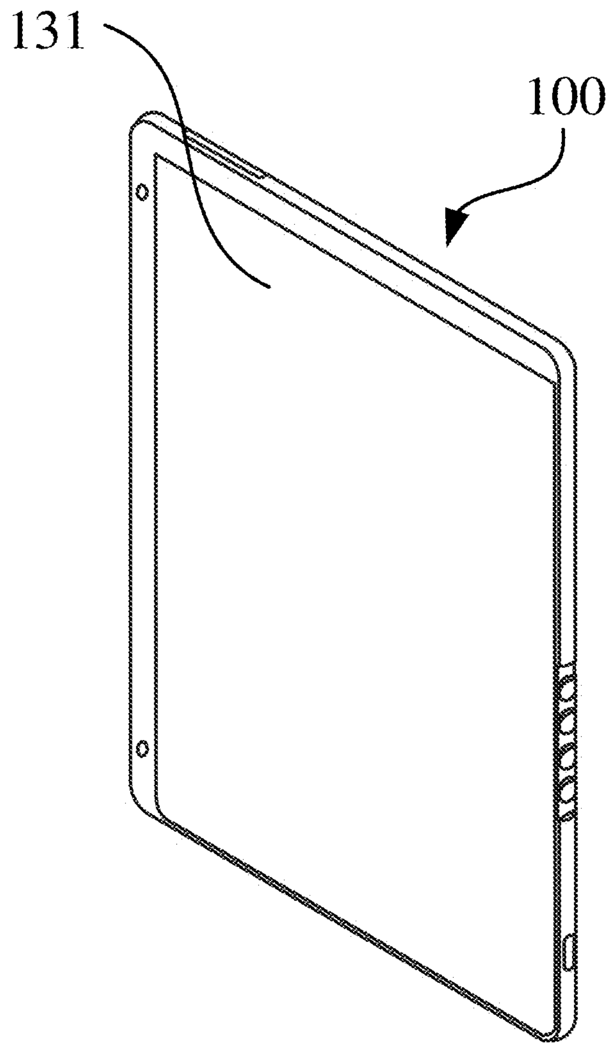
FIG. 1 is a schematic structural diagram of an electronic device provided in the embodiments of the present disclosure.

In order to enable those skilled in the art to better understand the solutions of the present disclosure, the technical solutions in the embodiments of the present disclosure will be clearly and comprehensively described below in conjunction with the drawings in the embodiments of the present disclosure.

In the related art, a user usually uses an electronic device to view and edit the content of a file, and then further process the file. For example, after editing the content of a document through a document editing application of the electronic device, the user exits the document editing application, starts a chat application, selects a corresponding contact, and then turns on the file sending function; thereafter, the user retrieves the edited document and sends it. For another example, when the user uses the chat application to chat, he or she needs to edit the content of a document and then send, through the chat application, the edited document to a chat object; in this case, the user also needs to edit the content of the document through a document editing application of the electronic device, then exits the document editing application, and returns to the chat application to select a corresponding contact; thereafter, the user turns on the file sending function, retrieves the edited document and sends it. As can be seen, after the user views and edits the content of a file through the electronic device, if the file needs to be further processed (for example, being sent to a chat object), cumbersome operations are required for such processing.

In view of this, the inventors propose a file processing method and apparatus, an electronic device and a storage medium provided in the embodiments of the present disclosure, by which the linkage between applications can be enriched, and operations in the file processing process can be reduced, thereby facilitating the user to process files and improving the operational convenience. The specific file processing method will be described in detail in the subsequent embodiments.

The embodiments of the present disclosure provide a file processing method for an electronic device, where the electronic device includes a screen, and the method includes: displaying a first interface of a first application in a first display area of the screen, the first interface including file content of a first file; in response to a first control operation, displaying a file identifier of the first file in a second interface displayed in a second display area of the screen, the second interface being an interface of a second application; and in response to a first operation performed on the file identifier in the second interface, performing, on the first file, processing corresponding to the first operation.

In some implementations of the present disclosure, the screen includes a first screen and a second screen, the first display area is located on the first screen, the second display area is located on the second screen, and the first screen is a foldable screen. The displaying the file identifier of the first file in the second interface displayed in the second display area of the screen in response to the first control operation, includes: in response to a first control operation that changes the first screen from being in an unfolded state to being in a folded state, displaying the file identifier of the first file in the second interface displayed in the second display area.

In some implementations of the present disclosure, before displaying the first interface of the first application in the first display area of the screen, the method further includes: while the first screen is in the folded state, in response to a second operation for the second application, displaying the second interface of the second application in the second display area.

The displaying the first interface of the first application in the first display area of the screen includes: after the first screen is changed from being in the folded state to being in the unfolded state, in response to a third operation for the first application, displaying the first interface of the first application in the first display area.

In some implementations of the present disclosure, after the first screen is changed from being in the folded state to being in the unfolded state, the method further includes: controlling the second screen to be in a screen-off state.

The displaying the file identifier of the first file in the second interface displayed in the second display area in response to the first control operation that changes the first screen from being in the unfolded state to being in the folded state, includes: in response to the first control operation, controlling the second screen to be in a screen-on state; and displaying the second interface, based on content displayed on the second screen before getting into the screen-off state, and displaying the file identifier of the first file in the second interface.

In some implementations of the present disclosure, the controlling the second screen to be in the screen-off state includes: controlling the second screen to be in the screen-off state, and saving a display status of the second screen.

The displaying the second interface based on the content displayed on the second screen before getting into the screen-off state includes: displaying the second interface by controlling the second screen to display, based on the saved display status of the second screen, the content displayed on the second screen before getting into the screen-off state.

In some implementations of the present disclosure, the displaying the first interface of the first application in the first display area in response to the third operation for the first application, after the first screen is changed from being in the folded state to being in the unfolded state, includes: after the first screen is changed from being in the folded state to being in the unfolded state, in response to the third operation for the first application, displaying the first interface of the first application in the first display area, and displaying a prompt message in the first interface, where the prompt message is used to prompt that the display status of the second screen has been saved.

In some implementations of the present disclosure, the controlling the second screen to be in the screen-on state in response to the first control operation includes: in response to the first control operation, controlling the second screen to be in the screen-on state, controlling the first screen to be in a screen-off state, and saving a display status of the first screen.

The method further includes: in response to a second control operation that changes the first screen from being in the folded state to being in the unfolded state, controlling the first screen to display, based on the saved display status of the first screen, content displayed on the first screen before getting into the screen-off state.

In some implementations of the present disclosure, the displaying the file identifier of the first file in the second interface displayed in the second display area in response to the first control operation that changes the first screen from being in the unfolded state to being in the folded state, includes: in response to the first control operation, displaying a third interface including an application icon of the second application; in response to a fourth operation performed on the application icon of the second application, displaying the second interface of the second application in the second display area, and displaying the file identifier of the first file in the second interface.

In some implementations of the present disclosure, the screen includes a first screen and a second screen, the first display area is located on the first screen, the second display area is located on the second screen, and the second screen is a foldable screen. The displaying the file identifier of the first file in the second interface displayed in the second display area of the screen in response to the first control operation, includes: in response to a first control operation that changes the second screen from being in a folded state to being in an unfolded state, displaying the file identifier of the first file in the second interface displayed in the second display area.

In some implementations of the present disclosure, the screen is a foldable screen, the first display area is an entire display area of the screen, and the second display area is a partial display area of the screen. The displaying the file identifier of the first file in the second interface displayed in the second display area of the screen in response to the first control operation, includes: in response to a first control operation that changes the screen from being in an unfolded state to being in a folded state, displaying the second interface of the second application in the second display area, and displaying the file identifier of the first file in the second interface.

In some implementations of the present disclosure, before displaying the file identifier of the first file in the second interface displayed in the second display area of the screen in response to the first control operation, the method further includes: in response to an editing operation performed on the file content, editing the file content and obtaining the edited first file.

In some implementations of the present disclosure, the second interface is a chat interface of a chat application. The performing, on the first file, processing corresponding to the first operation in response to the first operation performed on the file identifier in the second interface includes: in response to a first drag operation performed on the file identifier in the chat interface, sending the first file.

In some implementations of the present disclosure, the sending the first file in response to the first drag operation performed on the file identifier in the chat interface includes: obtaining an end position of the first drag operation, in response to the first drag operation performed on the file identifier in the chat interface; and in response to the end position being located in a first preset area of the chat interface, sending the first file.

In some implementations of the present disclosure, the first preset area may include an area where an object identifier of a chat object is located, and the sending the first file in response to the end position being located in the first preset area of the chat interface includes: in response to the end position being located in an area of the chat interface where a target object identifier is located, obtaining a target chat object corresponding to the target object identifier; and sending the first file to the target chat object.

In some implementations of the present disclosure, after obtaining the end position of the first drag operation, the method further includes: in response to the end position being located in a second preset area of the chat interface, canceling the displaying of the file identifier.

In some implementations of the present disclosure, the second interface is a file management interface of a file management application, and the performing, on the first file, the processing corresponding to the first operation in response to the first operation performed on the file identifier in the second interface, includes: in response to a second drag operation performed on the file identifier in the file management interface, saving the first file to a target folder.

In some implementations of the present disclosure, after displaying the file identifier of the first file in the second interface displayed in the second display area of the screen in response to the first control operation, the method further includes: displaying a preview image of the file content of the first file in the second interface, in response to a fifth operation performed on the file identifier in the second interface.

The electronic device involved in the file processing methods provided in the embodiments of the present disclosure is first introduced below.

Figure 2:
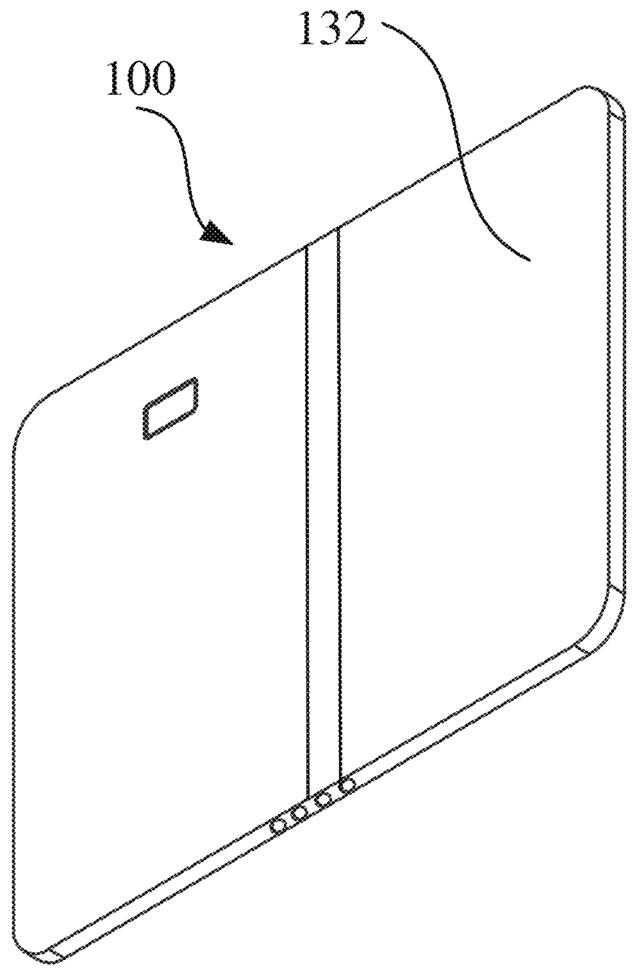
FIG. 2 is a schematic structural diagram of the electronic device provided in the embodiments of the present disclosure.

In some implementations, referring to both FIG. 1 and FIG. 2, FIG. 1 is a schematic structural diagram of a foldable electronic device 100 from a first perspective, and FIG. 2 is a schematic structural diagram of the electronic device 100 from a second perspective. The screen of the electronic device 100 includes a first screen 131 and a second screen 132. The first screen 131 is a foldable screen, and the size of the first screen 131 is larger than the size of the second screen 132. When the first screen 131 is in an unfolded state, the first screen 131 and the second screen 132 are opposite to each other. That is, when the light emitting direction of the first screen 131 faces toward the user, the light emitting direction of the second screen 132 faces away from the user. In this case, the first screen 131 with a larger size than the second screen 132 may be used to display content. When the first screen 131 is in a folded state, the first screen 131 is hidden inside the electronic device 100. In this case, the light emitting direction of the second screen 132 still faces the outside, and the second screen may be used to display content.

In other words, the electronic device 100 illustrated in FIG. 1 and FIG. 2 is an electronic device with an inward-folding screen. When the user needs to use the first screen 131 of a larger size, the first screen 131 may be controlled to be unfolded so that the light emitting directions of the first screen 131 and the second screen 132 face different sides. When the user does not need to use the first screen 131 of a larger size, the first screen 131 may be controlled to be folded, so that the first screen 131 is hidden inside the electronic device 100 to protect the first screen 131.

In the above implementations, the first screen 131 and the second screen 132 may display interfaces of different applications, respectively. For example, a first display area of the first screen 131 displays a first interface of a first application, to view and edit the file content of a first file; and a second display area of the second screen 132 displays a second interface of a second application. After the user views and edits the file content of the first file, a first control operation is input. In response to the first control operation, the electronic device displays a file identifier of the first file in the second interface for the user to operate, which enables the first file to be processed in the second interface of the second application.

Figure 3:
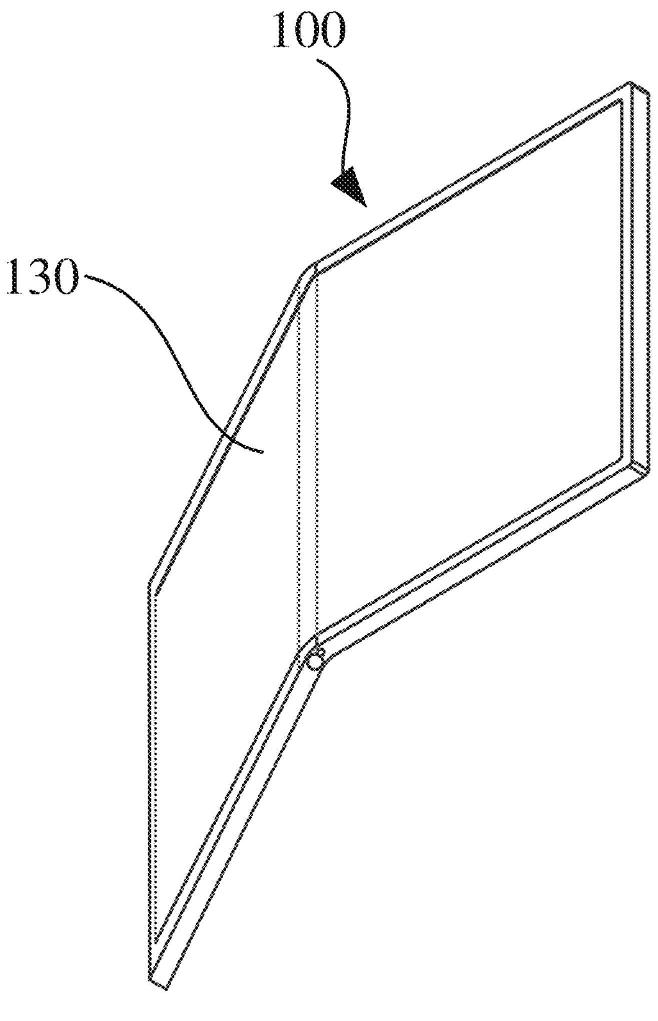
FIG. 3 is a schematic structural diagram of the electronic device provided in the embodiments of the present disclosure.
Figure 4:
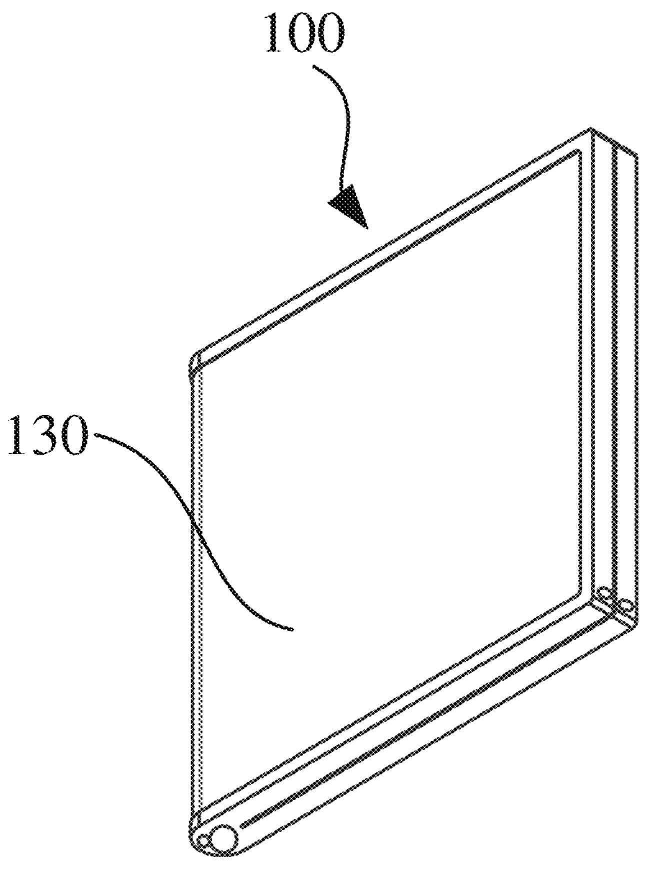
FIG. 4 is a schematic structural diagram of the electronic device provided in the embodiments of the present disclosure.

In some other implementations, referring to both FIG. 3 and FIG. 4, schematic structural diagrams of a foldable electronic device 100 are illustrated. The electronic device 100 includes a foldable screen 130. In such implementations, as illustrated in FIG. 3, when the screen 130 is unfolded, the light emitting direction of the entire screen 130 may face toward a same side. In this case, when the user uses the electronic device 100 to view the displayed content, the user may view the content displayed on the entire screen

130. As illustrated in FIG. 4, when the screen 130 is folded, one part of the display area is folded relative to the other part of the display area. In this case, the light emitting directions of the two parts of the display area are opposite. Accordingly, when the user uses the electronic device 100 to view the displayed content, the user may view the content displayed on a part of the display area.

In other words, the electronic device 100 illustrated in FIG. 3 and FIG. 4 is an electronic device with an outward-folding screen. When the user needs to use a larger display area, the screen 130 may be controlled to be unfolded, so that the light emitting direction of the entire screen 130 faces the same side and the entire screen 130 may be used to display the content, which enables the display content of the entire screen 130 to be viewed. When the user does not need to use a larger display area, the screen 130 may be controlled to be folded so that one part of the display area is folded relative to the other part of the display area, and the content may be displayed through a part of the display area.

In the above implementations, when the screen 130 is unfolded, the entire screen 130 may serve as the first display area, and the first interface of the first application may be displayed in the first display area for viewing and editing the file content of the first file; as such, the file content of the first file is displayed in a larger display area relative to that obtained when the screen 130 is in the folded state, which facilitates the user to view and edit the file content. When the screen 130 is in the folded state, a display area with the light emitting direction facing toward the user may serve as the second display area. After the user views and edits the file content of the first file, a first control operation is input by controlling the screen 130 to be in the folded state. Then, in response to the first control operation, the electronic device displays the file identifier of the first file in the second interface for the user to operate, which enables the first file to be processed in the second interface of the second application.

Figure 5:
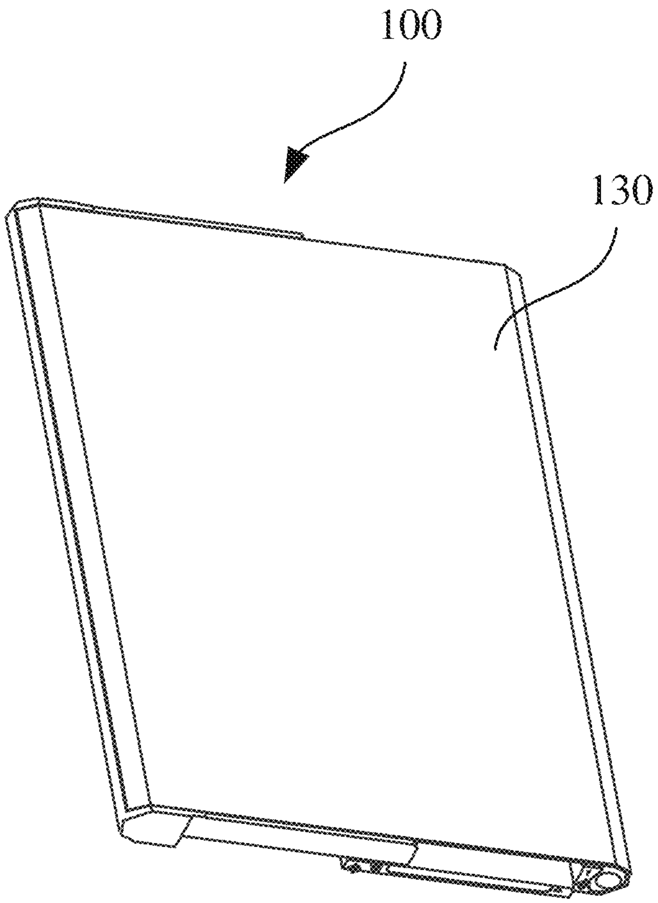
FIG. 5 is a schematic structural diagram of the electronic device provided in the embodiments of the present disclosure.
Figure 6:
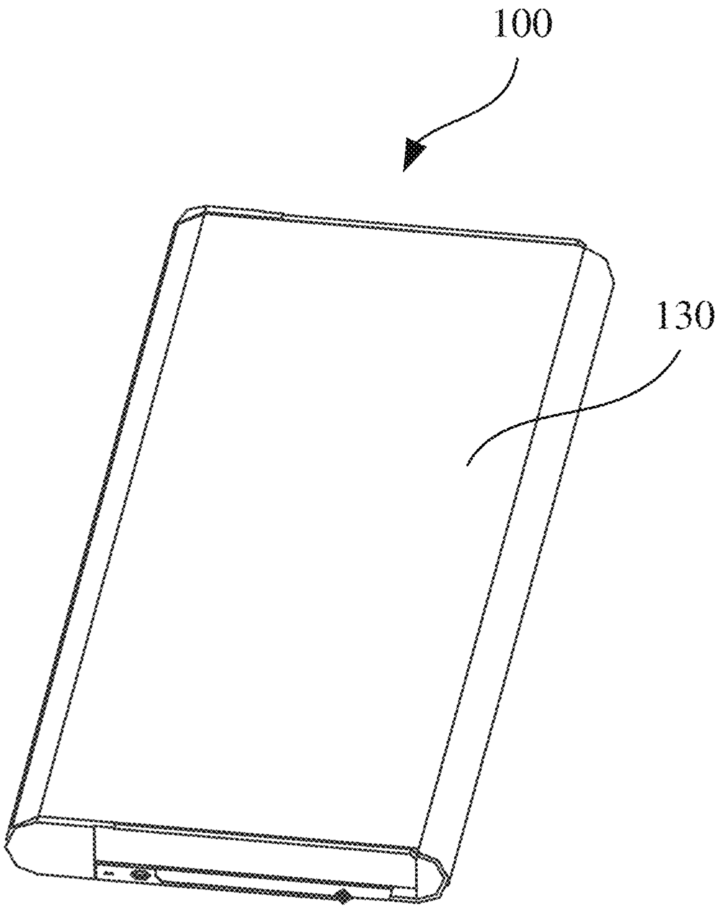
FIG. 6 is a schematic structural diagram of the electronic device provided in the embodiments of the present disclosure.

In some other implementations, referring to both FIG. 5 and FIG. 6, schematic structural diagrams of a push-pull electronic device 100 are illustrated. As illustrated in FIG. 5, when the screen 130 is unfolded, the light emitting direction of the entire screen 130 may face toward a same side. In this case, when the user uses the electronic device 100 to view the displayed content, the user may view the content displayed on the entire screen 130. As illustrated in FIG. 6, when the screen 130 is folded, one part of the display area is hidden relative to the other part of the display area. In this case, part of the display area of the screen 130 is in a display state. Similarly, when the screen 130 is unfolded, the entire screen 130 may serve as the first display area, and the first interface of the first application may be displayed in the first display area for viewing and editing the file content of the first file; as such, compared with the case where the screen 130 is in the folded state, the file content of the first file is displayed in a relatively larger display area, which facilitates the user to view and edit the file content. When the screen 130 is folded, the exposed display area may serve as the second display area. After the user views and edits the file content of the first file, the first control operation is input by controlling the screen 130 to be in the folded state. Then, in response to the first control operation, the electronic device displays the file identifier of the first file in the second interface for the user to operate, which enables the first file to be processed in the second interface of the second application.

The file processing methods provided in the embodiments of the present disclosure are described in detail below with reference to the accompanying drawings.

Figure 7:
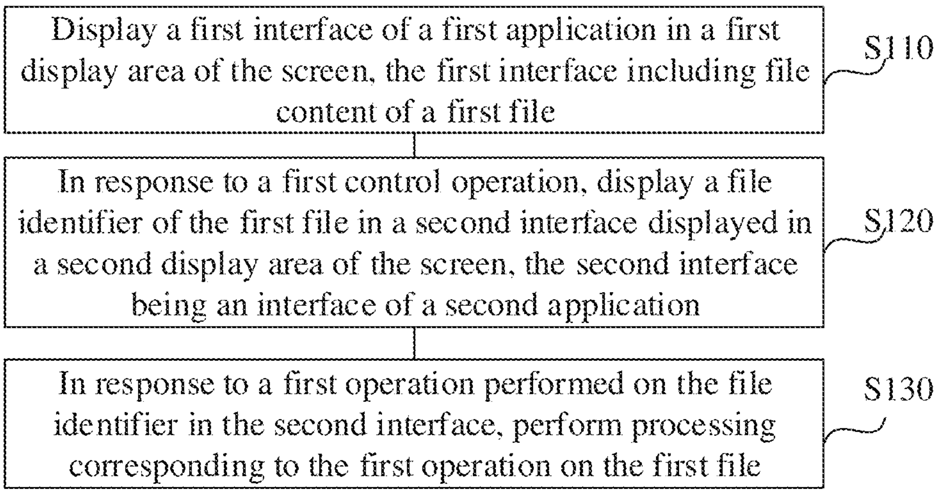
FIG. 7 is a flow chart of a file processing method according to an embodiment of the present disclosure.

As illustrated in FIG. 7, a flowchart of a file processing method provided in an embodiment of the present disclosure is shown. The file processing method is applied to the above electronic devices. The process illustrated in FIG. 7 is described in detail below. The file processing method may specifically include operations S110-S130 as follows.

At block S110, a first interface of a first application is displayed in a first display area of the screen, the first interface including file content of a first file.

The screen of the electronic device includes the first display area and a second display area. The first display area and the second display area may be located on different screens or on a same screen. When the first display area and the second display area are located on a same screen, the first display area and the second display area may be different display areas. For example, the screen is divided into the first display area and the second display area. The first display area and the second display area may also be in an inclusive relationship, for example, the first display area is the entire display area of the screen, and the second display area is a partial display area of the screen. In the embodiments of the present disclosure, the electronic device may display the first interface of the first application through the first display area, and the first interface includes the file content of the first file, which facilitates the user to view the file content of the first file through the first application.

In some implementations, the first file may be a text file, a picture file, a video file, a music file, etc., and the specific file type thereof may not be limited. The first application may be an application for viewing and editing the file content of a file, such as a picture editing application, a text editing application, or a music editing application, and the specific type of the first application may not be limited. When the first interface of the first application is displayed in the first display area of the screen, the first file may be opened in response to an operation input by the user, and the file content of the first file may be visually displayed, so that the user may view, edit, and perform other operations on the file content of the first file, to implement the user's required processing on the file content.

At block S120, in response to a first control operation, a file identifier of the first file is displayed in a second interface displayed in a second display area of the screen, the second interface being an interface of a second application.

In the embodiments of the present disclosure, when the first interface is displayed in the first display area of the screen, if the electronic device detects a first control operation, the file identifier of the first file may be displayed in the second interface of the second application displayed in the second display area, so that the user may process the first file in the second application based on the displayed file identifier. The file identifier may be a file icon, a thumbnail of the file content, etc., which is not limited herein.

In some implementations, if the first display area and the second display area are located on different screens, the first display area and the second display area may be in the display state simultaneously, or may not be in the display state simultaneously, so that the electronic device may display the first interface in the first display area and the second interface in the second display area simultaneously, or may not display the first interface in the first display area and the second interface in the second display area simultaneously. If the first display area and the second display area are located on a same screen and the first display area and the second display area are different display areas, the first display area and the second display area may be in the display state simultaneously, or may not be in the display state simultaneously, so that the electronic device may display the first interface in the first display area and the second interface in the second display area simultaneously, or may not display the first interface in the first display area and the second interface in the second display area simultaneously. If the first display area and the second display area are located on a same screen and the first display area and the second display area are in an inclusive relationship, for example, the first display area is the entire display area of the screen, and the second display area is a partial display area of the screen, then the first display area and the second display area are not in the display state simultaneously. When the electronic device displays the first interface in the first display area, it may not display the second interface in the second display area. Similarly, when the second interface is displayed in the second display area, the first interface may not be displayed in the first display area.

In a possible implementation, in a case where the first display area and the second display area are not in the display state simultaneously, the electronic device may save the display status of the first display area and the display status of the second display area. That is, when each of the first display area and the second display area is switched from displaying content to not displaying content, the display status such as the currently displayed interface content thereof may be saved. For example, if it is switched from displaying content through the first display area to displaying content through the second display area, the display status of the first display area may be saved. Therefore, when it needs to switch to displaying content through the first display area, the first display area may be controlled to display the previously displayed content.

In some implementations, the first control operation may be a control operation input by the user through the screen, a physical button, and the like. In some implementations, the electronic device may determine that the input first control operation is detected, in response to detecting, on the screen, a sliding operation meeting a preset sliding condition. The preset sliding condition may be that the sliding trajectory of the siding operation is a preset sliding trajectory, the sliding length of the siding operation is greater than a preset sliding length, etc., and the specific preset sliding condition may not be limited herein. In some implementations, the electronic device may also display a specified control in the first display area, and in response to detecting a trigger operation on the specified control, it is determined that the first control operation is detected. In some implementations, the electronic device may also determine that the first control operation is detected in response to detecting an operation performed on a target physical key. Of course, the specific first control operation may not be limited herein.

In a possible implementation, the screen of the electronic device may be divided into the first display area and the second display area. The divided first display area may display the first interface, and the divided second display area may display the second interface of the second application. In other words, the screen displays the interfaces of different applications in different areas. In this implementation, the file identifier of the first file may be displayed in the second interface in response to the first control operation input by the user. Of course, the above ways of detecting the first control operation input by the user may also be used in other implementations of displaying the first interface and the second interface in the electronic device, which will not be elaborated here.

In some other implementations, in the case where the electronic device includes a foldable screen, the first control operation may be a control operation of changing the screen from being in a folded state to being in an unfolded state, and the electronic device may determine that the first control operation is detected in response to detecting that the screen is changed from being in the folded state to being in the unfolded state. The first control operation may also be a control operation of changing the screen from being in the unfolded state to being in the folded state, and the electronic device may determine that the first control operation is detected in response to detecting that the screen is changed from being in the unfolded state to being in the folded state.

In some implementations, the electronic device may display, before detecting the first control operation, the second interface of the second application in the second display area. That is, the user may trigger, through an operation, the electronic device to display the first interface in the first display area, and may trigger, through an operation, the second display area to display the second interface; after the file content of the first file is viewed, edited, or subjected to other processing through the first interface, the first control operation may be input to trigger the file identifier of the first file to be displayed in the second interface, so that the user may process the first file in the second application based on the displayed file identifier.

In some implementations, the electronic device may also trigger, after detecting the first control operation, the running of the second application and display the initial interface of the second application, according to an operation detected in the interface displayed in the second display area. After the second application is run, the second display area may be further controlled to display the second interface according to an input operation, so that the user may implement the required processing on the first file in the second interface.

At block S130, in response to a first operation performed on the file identifier in the second interface, processing corresponding to the first operation is performed on the first file.

In the embodiments of the present disclosure, after the electronic device displays the file identifier of the first file in the second interface, if a first operation performed on the file identifier is detected in the second interface, the electronic device may perform corresponding processing on the first file in response to the first operation. The processing of the first file may include sending the first file, grouping the first file, inserting the first file into an interface, copying and pasting the first file, etc. The specific processing of the first file may not be limited herein.

In the file processing method provided in the embodiments of the present disclosure, the first interface of the first application is displayed in the first display area, which allows the user to view, edit, and perform other operations on the file content of the first file through the first application. Then, in response to the first control operation, the file identifier of the first file is displayed in the second interface displayed in the second display area, which enables the user to process the first file based on the displayed file identifier. In this way, the linkage between applications can be enriched, and the operations in the file processing process can be reduced, thereby facilitating the user to process files and improving the operational convenience.

Figure 8:
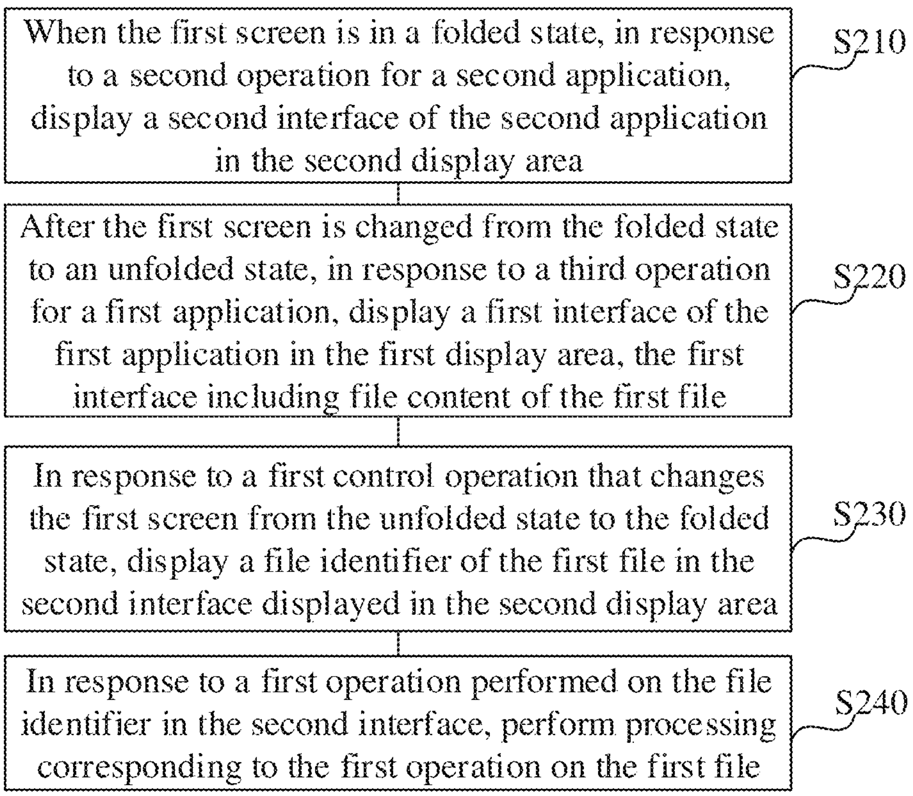
FIG. 8 is a flow chart of a file processing method according to another embodiment of the present disclosure.

As illustrated in FIG. 8, a flowchart of a file processing method provided in another embodiment of the present disclosure is shown. The file processing method is applied to the electronic device. The process illustrated in FIG. 8 is described in detail below. The file processing method may specifically include operations S210-S240 as follows.

At block S210, when the first screen is in a folded state, in response to a second operation performed on a second application, a second interface of the second application is displayed in the second display area.

The electronic device may be an electronic device with an inward-folding screen, for example one as illustrated in FIG. 1 and FIG. 2. The screen of the electronic device 100 includes a first screen 131 and a second screen 132. The first screen 131 is a foldable screen, and the size of the first screen 131 is larger than the size of the second screen 132. The first display area is located on the first screen 131, and the second display area is located on the second screen 132. When the first screen 131 is in the folded state, content may be displayed through the second screen 132. In some implementations, the first display area may be a partial display area of the first screen 131 or the entire display area of the first screen 131, and the second display area may be a partial display area of the second screen 132 or the entire display area of the second screen 132.

In the embodiment of the present disclosure, while the first screen is in the folded state and the second screen is in a display state, when a second operation for the second application is detected, the second interface of the second application may be displayed in the second display area in response to the second operation. It may be understood that, when the second screen is in the display state, the user may input the second operation for the second application as required, to control the second display area to display the second interface.

In some implementations, when the first screen is in the folded state, an interface including an application icon of the second application may be displayed on the second screen. In response to detecting a touch operation performed on the application icon of the second application, the second application may be run and the initial interface of the second application may be displayed. After the second application is run, the second display area may be controlled to display the second interface based on an input operation.

At block S220, after the first screen is changed from being in the folded state to being in an unfolded state, in response to a third operation for a first application, a first interface of the first application is displayed in the first display area, the first interface including file content of the first file.

In the embodiment of the present disclosure, after the second interface is displayed in the second display area of the second screen while the first screen is in the folded state, if the user needs to process the file content of the first file in the first application, the first screen may be controlled to change from being in the folded state to being in the unfolded state, which enables the first screen to be in a screen-on state. For example, when the user chats with a chat object through the chat interface of the chat application displayed in the second display area, if he/she wants to process the file content of the first file and sent the processed first file to the chat object, the first screen may be controlled to change from being in the folded state to being in the unfolded state, so as to perform the required processing of the file content of the first file in the first display area of the first screen. In this case, if the third operation for the first application is detected, the first interface of the first application is displayed in the first display area.

In some implementations, when the first screen is in the unfolded state, an interface including an application icon of the first application may be displayed on the first screen. In response to detecting a touch operation performed on the application icon, the first application may be run and the initial interface of the first application may be displayed. After the first application is run, the first display area is controlled, based on an input operation, to display the file content of the first file in the first interface. For example, if an opening operation for the first file is detected, the file content of the first file may be displayed in the first interface, for the user to perform corresponding operations on the file content of the first file.

In some implementations, after the first interface is displayed in the first display area, if an editing operation performed on the file content is detected, the file content may be edited in response to the editing operation, to obtain the edited first file. For example, if the first file is a text file, in response to a deletion operation, a moving operation, a copying operation, a pasting operation, an adding operation or other operations performed on the text content of the first file, corresponding editing processing may be performed on the text content. For another example, if the first file is an image file, in response to a brightness adjustment operation, a cropping operation, a resizing operation, a graffiti operation or other editing operations performed on the image content, corresponding editing processing may be performed on the image. For another example, if the first file is a music file, in response to a cropping operation, a volume adjustment operation, a mixing operation or other editing operations performed on the audio content, corresponding editing processing may be performed on the audio content. Of course, the specific editing operations and editing processing may not be limited in the embodiments of the present disclosure.

At block S230, in response to a first control operation that changes the first screen from being in the unfolded state to being in the folded state, a file identifier of the first file is displayed in the second interface displayed in the second display area.

In the embodiment of the present disclosure, after the first interface is displayed through the first display area of the first screen, in response to detecting the first control operation that changes the first screen from being in the unfolded state to being in the folded state, the file identifier of the first file is displayed in the second interface displayed in the second display area, so that the user may process the first file based on the file identifier. It may be understood that, after the user completes the required processing on the file content of the first file through the first interface displayed in the first display area of the first screen, if he/she needs to further process the processed first file in the second interface of the second application, the first screen is no longer needed. As such, the first screen may be controlled to change from being in the unfolded state to being in the folded state, so that the second screen may be used to implement the subsequent processing. Therefore, when the electronic device detects the first control operation that changes the first screen from being in the unfolded state to being in the folded state, the file identifier of the first file may be displayed in the second interface displayed in the second display area.

In some implementations, after the first screen is changed from being in the folded state to being in the unfolded state, the second screen may be controlled to be in a screen-off state. Thus, when the user needs to use the first screen, the second screen is not remained in the screen-on state, which prevents increase of power consumption resulted therefrom and prevents user's misoperation on the second screen. In this case, in response to detecting the first control operation that changes the first screen from being in the unfolded state to being in the folded state, the second screen may be controlled to change from being in the screen-off state to being in a screen-on state. Based on the content displayed on the second screen before getting into the screen-off state, the second interface is displayed; and the file identifier of the first file is displayed in the second interface. Of course, when the first screen of the electronic device with an inward-folding screen is in the folded state, the first screen of the electronic device is hidden in the housing of the electronic device, and the first screen is thus not used at this time. Therefore, in this case, the first screen may be controlled to be in the screen-off state.

In a possible implementation, the first screen and the second screen are not in the screen-on state simultaneously. Therefore, in order to facilitate the user to perform different operations using the first screen and the second screen, when the first screen is changed from being in the screen-on state to being in the screen-off state, the display status of the first screen may be saved, that is, the content currently displayed on the first screen may be saved. Similarly, when the second screen is changed from being in the screen-on state to being in the screen-off state, the display status of the second screen may be saved. That is to say, when it is detected that the first screen is changed from being in the unfolded state to being in the folded state, the first screen is then in the screen-off state and the second screen is then in the screen-pm state, and the display status of the first screen at the time of being turned off may be saved. When it is detected that the first screen is changed from being in the folded state to being in the unfolded state, the first screen is then in the screen-on state and the second screen is then in the screen-off state, and the display status of the second screen at the time of being turned off may be saved. Therefore, in response to detecting the first control operation that changes the first screen from being in the unfolded state to being in the folded state, the second screen may be controlled to be changed from being in the screen-off state to being in the screen-on state, and the second screen may be controlled to display its previously displayed content based on the saved display status of the second screen, so that the previously displayed second interface may be displayed in the second display area.

It is notable that the above way of saving the display status of the first screen and the display status of the second screen is not limited to the file processing process, and the display status of the first screen and the display status of the second screen may be saved in the similar way when the electronic device is in any scenario. That is to say, in a scenario where the first screen displays any interface, if it is detected that the first screen is changed from being in the unfolded state to being in the folded state, the first screen may be controlled to be in the screen-off state, and the current display status of the first screen may be saved at the same time; and when it is detected that the first screen is switched to the unfolded state again, the first screen may be controlled to display, based on the saved display status of the first screen, the content displayed on the first screen before it was changed to the screen-off state. Similarly, in a scenario where the second screen displays any interface, if it is detected that the first screen is changed from being in the folded state to being in the unfolded state, the second screen may be controlled to be in the screen-off state, and the current display status of the second screen may be saved at the same time; and when it is detected that the first screen is switched to the folded state again, the second screen may be controlled to display, based on the saved display status of the second screen, the content displayed on the second screen before it was changed to the screen-off state.

Figure 9:
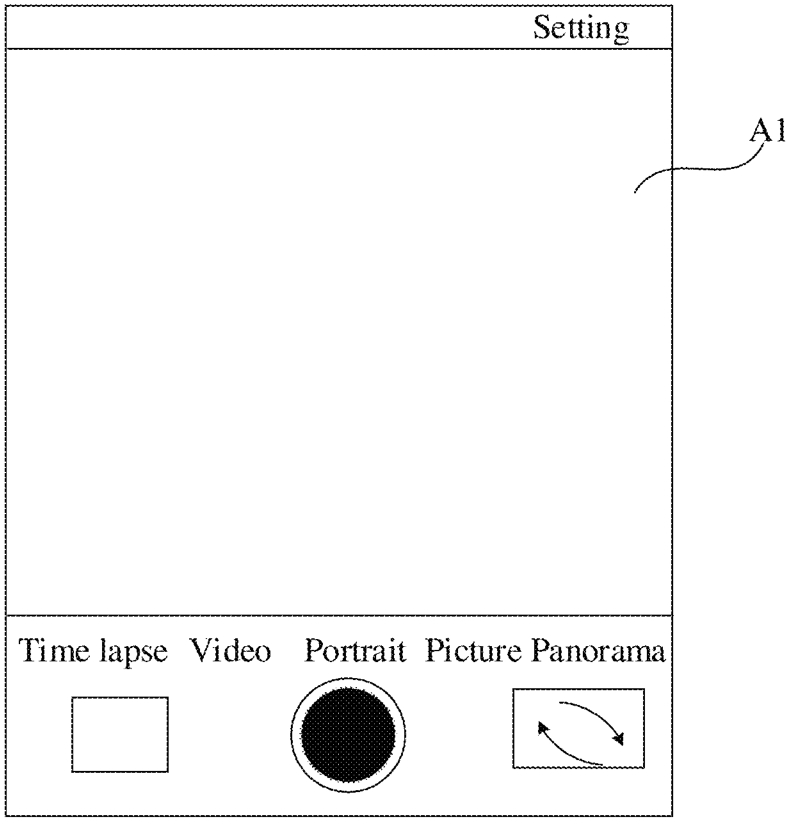
FIG. 9 is a schematic diagram illustrating an interface provided in the embodiments of the present disclosure.
Figure 10:
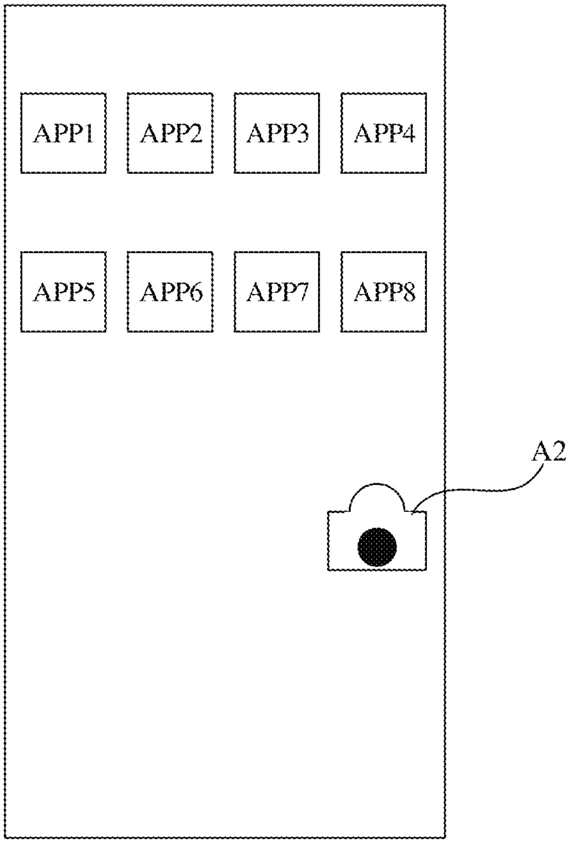
FIG. 10 is a schematic diagram illustrating an interface provided in the embodiments of the present disclosure.

In some implementations, in a scenario where the first screen displays any interface, if it is detected that the first screen is changed from being in the unfolded state to being in the folded state, the current display status of the first screen may be saved while the first screen is controlled to be in the screen-off state, and after the second screen is controlled to be in the screen-on state, a prompt message is displayed in the display interface of the second screen. The prompt message is used to prompt that the display status of the first screen has been saved. The prompt message may be a thumbnail of the saved display interface of the first screen, an application icon of the application in the interface displayed on the first screen, etc. Exemplarily, as illustrated in FIG. 9, when the first screen is in the unfolded state, it is in the screen-on state and displays a photo taking interface A1; and as illustrated in FIG. 10, if it is detected that the first screen is changed from being in the unfolded state to being in the folded state, icon A2 of the photo taking application may be displayed in the interface displayed on the second screen. It is notable that, if the interface displayed on the first screen is the above-mentioned first interface, that is, if the interface displayed on the first screen includes the file content of the first file, the prompt information may be the file identifier of the first file, so that the user may process the first file according to the displayed file identifier, and may know that the display status of the first screen has been saved.

Figure 11:
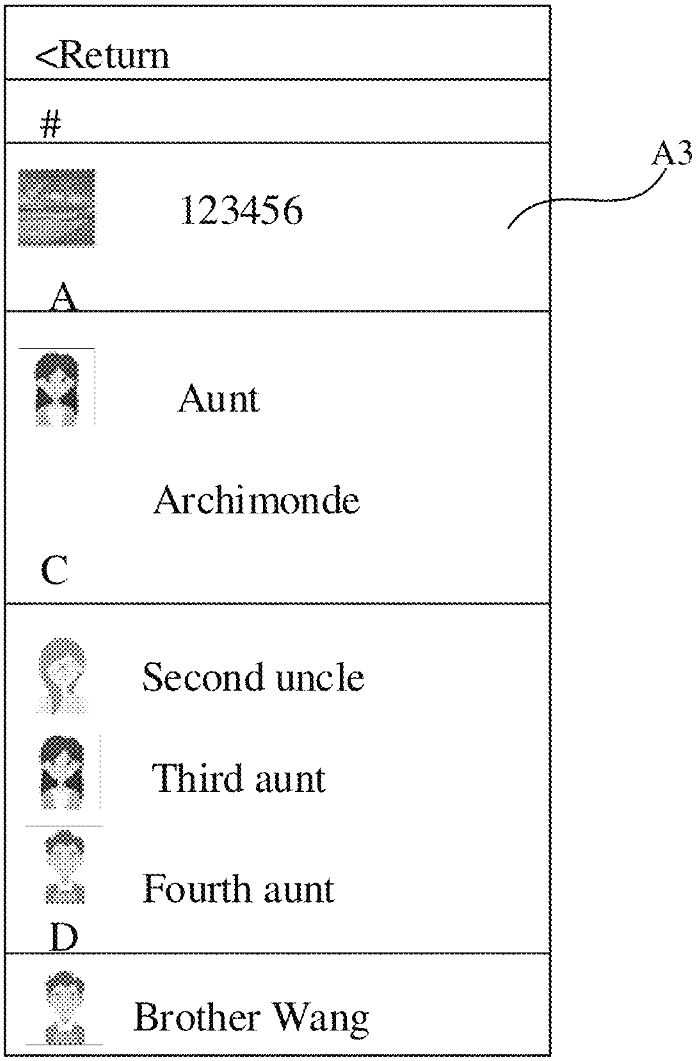
FIG. 11 is a schematic diagram illustrating an interface provided in the embodiments of the present disclosure.
Figure 12:
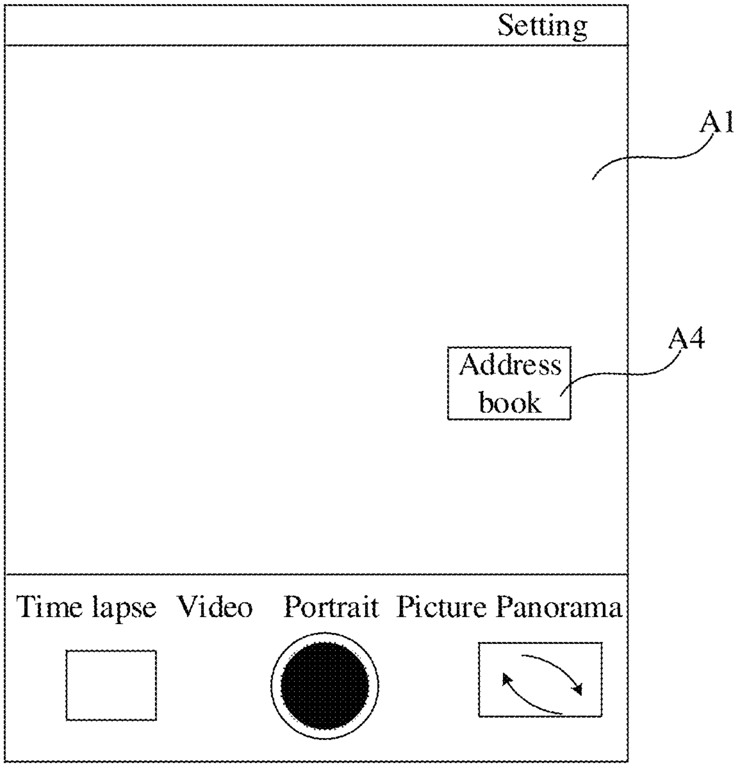
FIG. 12 is a schematic diagram illustrating an interface provided in the embodiments of the present disclosure.

Similarly, in a scenario where the second screen displays any interface, if it is detected that the first screen is changed from being in the folded state to being in the unfolded state, the current display status of the second screen may be saved while the second screen is controlled to be in the screen-off state, and after the first screen is controlled to be in the screen-on state, a prompt message is displayed in the display interface of the first screen. The prompt message is used to prompt that the display status of the second screen has been saved. The prompt message may be a thumbnail of the saved display status of the second screen, an application icon of the application in the interface displayed on the second screen, etc. For example, at block S220, after the first screen is changed from being in the folded state to being in the unfolded state, in response to the third operation performed on the first application, the first interface of the first application may be displayed in the first display area, and the prompt message may be displayed in the first interface. Exemplarily, as illustrated in FIG. 11, when the first screen is in the folded state, the second screen is in the screen-on state and displays an address book interface A3; and as illustrated in FIG. 12, if it is detected that the first screen is changed from being in the folded state to being in the unfolded state, icon A4 of the address book may be displayed in the interface displayed on the first screen.

In some implementations, in a case where the first display area of the first screen displays the interface of a chat application, when it is detected that the first screen is changed from being in the unfolded state to the folded state, the current display status of the first screen is saved, and the second screen is controlled to be in the screen-on state. Then, if a chat message sent by a chat object in the chat application is received, a prompt information of the chat message may also be displayed on the second screen. Similarly, in a case where the second display area of the second screen displays the interface of a chat application, when it is detected that the first screen is changed from being in the folded state to being in the unfolded state, the current display status of the second screen is saved, and the first screen is controlled to be in the screen-on state. Then, if a chat message sent by a chat object in the chat application is received, prompt information of the chat message may also be displayed on the first screen.

Figure 13:
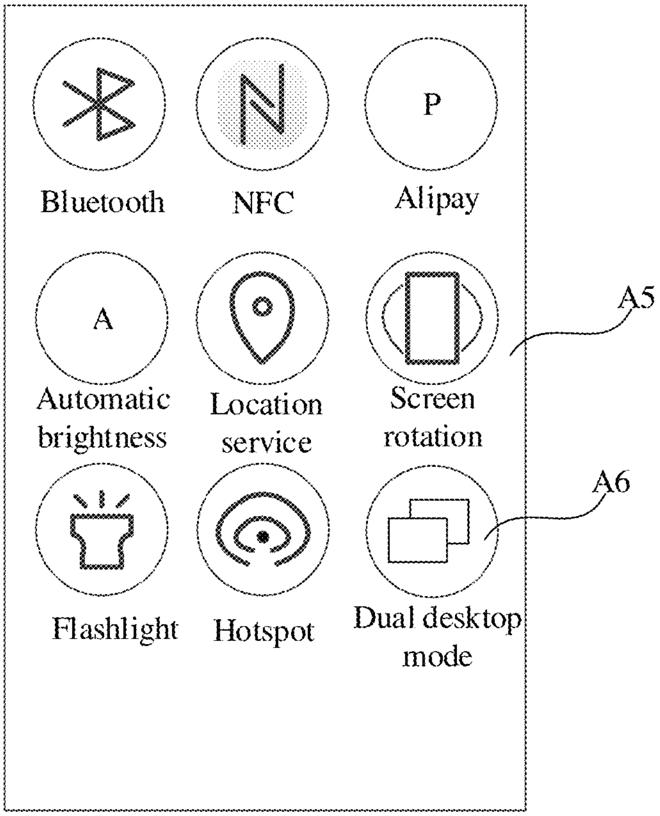
FIG. 13 is a schematic diagram illustrating an interface provided in the embodiments of the present disclosure.

In some implementations, when a dual desktop mode of the electronic device is enabled, the above-mentioned operations of saving, when each of the first screen and second screen is changed from being in the screen-on state to being in the screen-off state, the display status of the respective screen before being turned off, and displaying, when the screen is changed to being in the screen-on state again, the content displayed before being turned off based on the display status of the screen saved before it was turned off, may be executed. In an implementation, as illustrated in FIG. 13, the first screen or the second screen of the electronic device may display a switch control A6 for the dual desktop mode in a status bar A5. When an operation performed on the switch control A6 is detected, the dual desktop mode of the electronic device may be controlled to be enabled or disabled, thereby allowing the user to control the dual desktop mode to be enabled or disabled as required. Of course, the electronic device may also display a switch control for the dual desktop mode in the setting interface, so that the user may control the dual desktop mode to be enabled or disabled. As such, when the dual desktop mode is enabled, the first screen and the second screen may display interfaces of two applications thereon respectively, and the information status display, interactive operations, etc. thereof do not interfere with each other, thereby forming dual desktops sharing a common system. The desktops may be switched by controlling the first screen to be in the folded state or the unfolded state.

At block S240, in response to a first operation performed on the file identifier in the second interface, processing corresponding to the first operation is performed on the first file.

In some embodiments, the second interface may be a chat interface of a chat application. After the file identifier of the first file is displayed in the chat interface, if a first drag operation performed on the file identifier is detected, the first file may be sent to the client of the current chat object. The first drag operation refers to a sliding operation performed while pressing the displayed file identifier. In some implementations, in response to the first drag operation performed on the file identifier, the file identifier may be controlled to move with the sliding trajectory of the first drag operation, so as to control the file identifier to move to the end position of the first drag operation.

In some implementations, in response to the first drag operation performed on the file identifier in the chat interface, the end position of the first drag operation may be obtained. The end position refers to a position where the sliding operation performed while pressing the file identifier ends. After obtaining the end position of the first drag operation, it may be determined whether the end position is within a first preset area of the chat interface. The first preset area is a preset area for triggering sending of a file. For example, the first preset area is an area of the chat interface where a chat box is located. If the end position is located in the first preset area of the chat interface, the first file may be sent. Otherwise, if the end position is not located in the first preset area of the chat interface, the first file is not sent. In this way, the first file is sent only when the end position of the drag operation performed on the file identifier of the first file is in the first preset area, which avoids the occurrence of erroneous file sending.

Figure 14:
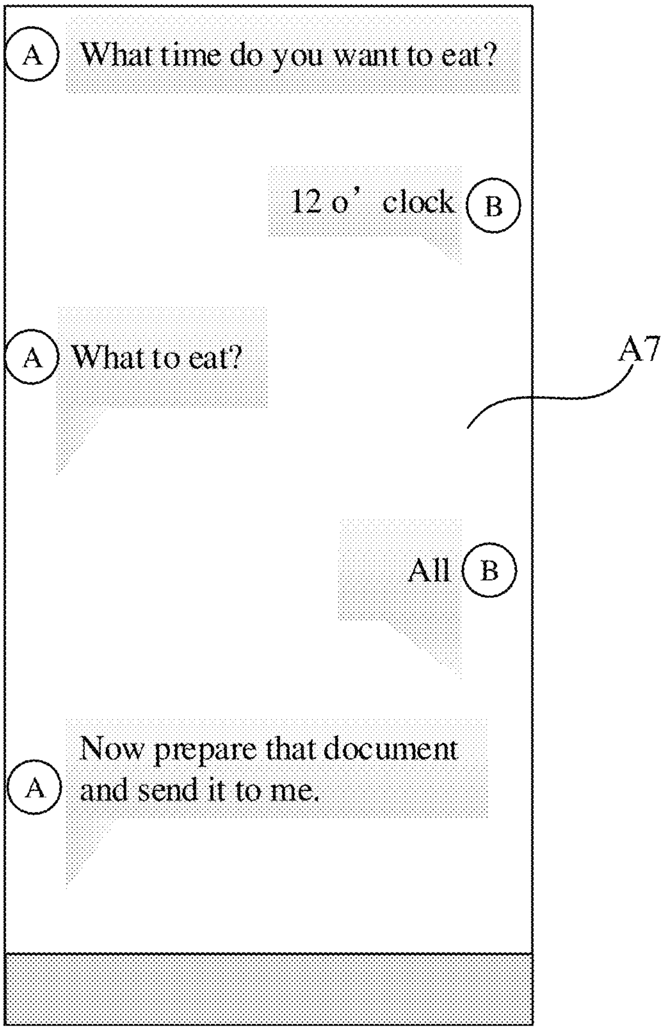
FIG. 14 is a schematic diagram illustrating an interface provided in the embodiments of the present disclosure.
Figure 15:
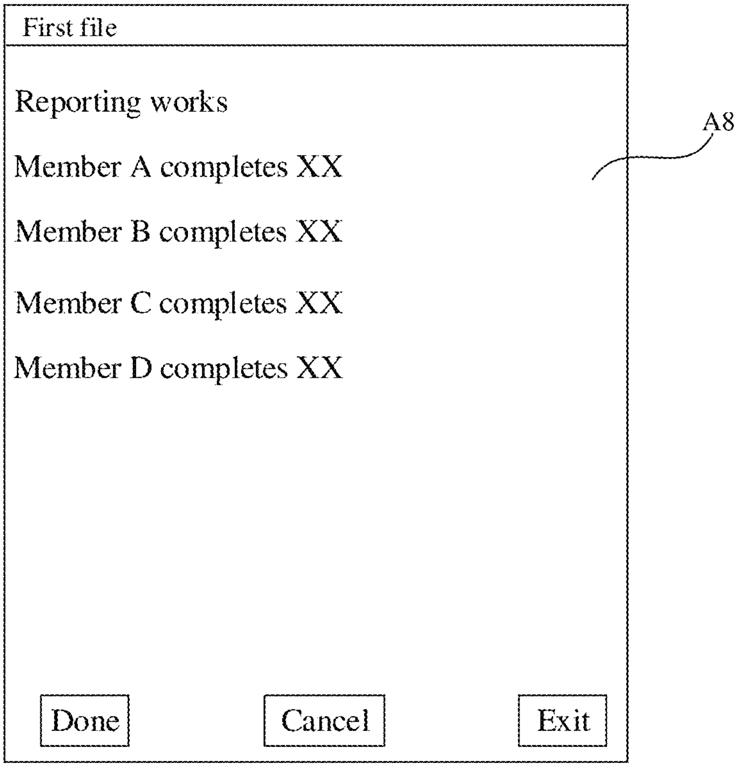
FIG. 15 is a schematic diagram illustrating an interface provided in the embodiments of the present disclosure.
Figure 16:
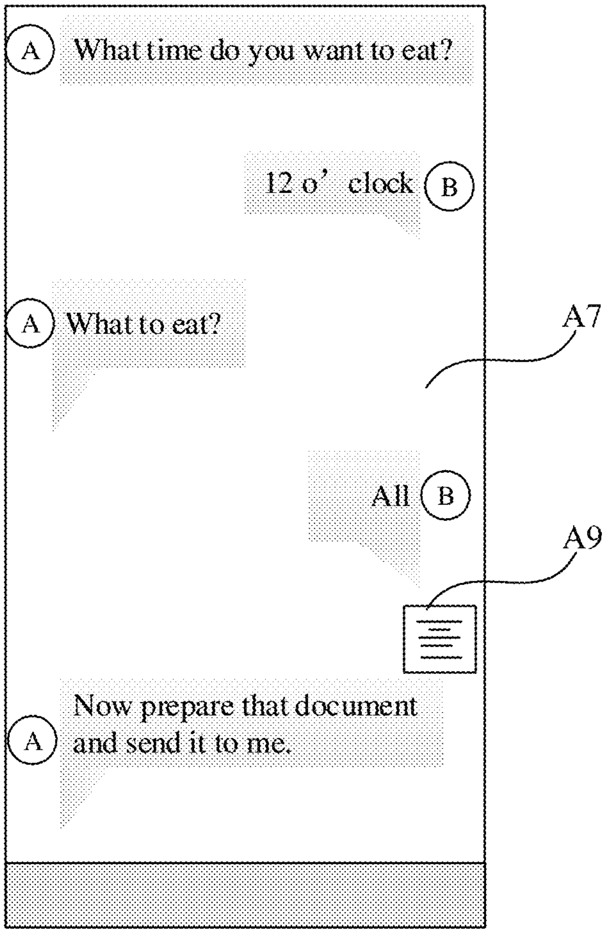
FIG. 16 is a schematic diagram illustrating an interface provided in the embodiments of the present disclosure.
Figure 17:
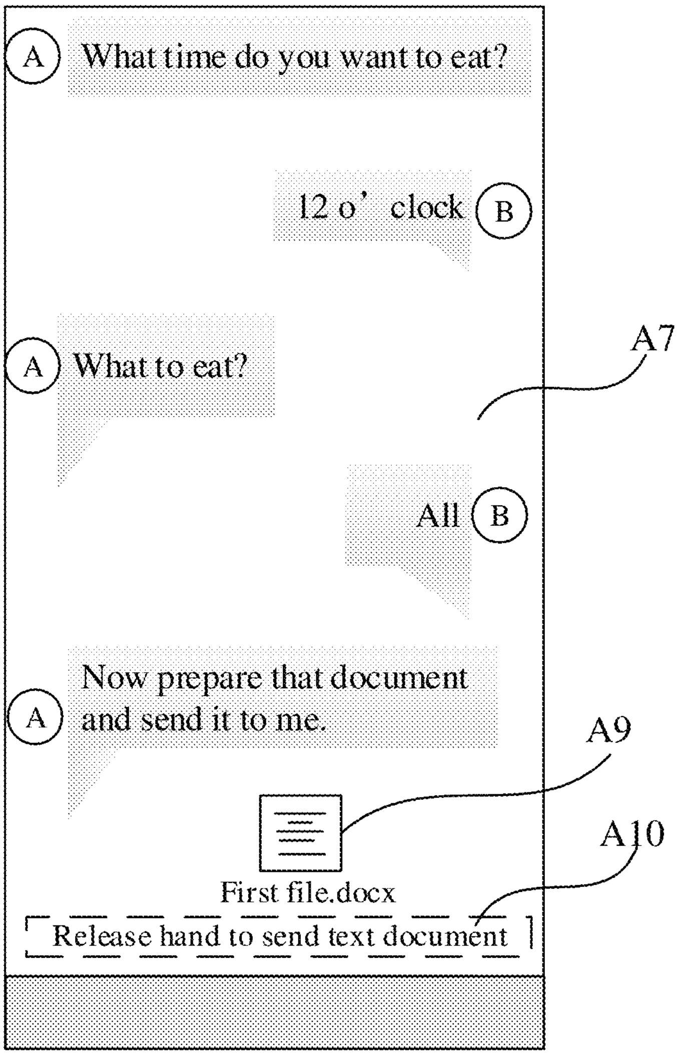
FIG. 17 is a schematic diagram illustrating an interface provided in the embodiments of the present disclosure.

The following is an example of implementing the file processing method provided in the embodiments of the present disclosure in a chat scenario. Exemplarily, as illustrated in FIG. 14, when the first screen is in the folded state, a chat interface A7 of a chat application may be displayed in the second display area of the second screen. As illustrated in FIG. 15, when the first screen is in the unfolded state, an editing interface A8 of a text document may be displayed in the first display area of the first screen. As illustrated in FIG. 16, in response to detecting a first control operation that changes the first screen from being in the unfolded state to being in the folded state, a file identifier A9 of the text document may be displayed in the chat interface A7 displayed in the second display area. As illustrated in FIG. 17, when a first drag operation performed on the file identifier A9 is detected and the file identifier A9 is moved to the chat box of the chat interface A7, a prompt message A10 may be displayed to prompt the user that the text document will be send if the user releases his/her hand, which triggers the text document to be sent to the client of the chat object.

In a possible implementation, the first preset area may include an area where an object identifier of the chat object is located, such as an area where the avatar of the chat object is located. When it is determined that the end position is located in the area of a target object identifier, a target chat object corresponding to the object identifier may be determined, and the first file may be sent to the client of the target chat object. Thus, the user may drag the file identifier to the area of an object identifier of a chat object to which the file is to be sent as required, and the first file may be correspondingly sent to the client of the chat object.

In a possible implementation, after the end position is obtained, it is also possible to determine whether the end position is located in a second preset area of the chat interface, where the second preset area is an area for triggering the file identifier to be hidden. For example, the second preset area may be an edge area of the chat interface. If the end position is located in the second preset area, the displaying of the file identifier of the first file may be canceled. That is, if the end position is not located in the second preset area, the displaying of the file identifier of the first file is maintained. In this way, it is possible to control whether the displayed file identifier is hidden or not according to the user's requirements, so as to avoid the displayed file identifier from affecting the user's viewing of the content of the second interface.

In a possible implementation, it may also perform timing since the electronic device displays the file identifier in the second interface. The timing duration may be compared with a preset duration, and it is determined, based on the comparison result, whether the timing duration reaches the preset duration. If the timing duration reaches the preset duration, the displaying of the file identifier of the first file may be cancelled. Otherwise, if the timing duration does not reach the preset duration, the displaying of the file identifier of the first file may be maintained. The preset duration may not be specifically limited, for example, it may be 3 seconds, 5 seconds, 30 seconds, 1 minute, etc.

In some embodiments, the second interface may be a file management interface of a file management application. After the file identifier of the first file is displayed in the file management interface, if a second drag operation performed on the file identifier is detected, the first file may be saved to a target folder. The electronic device may determine, based on an end position of the second drag operation, an area of a folder icon where the end position is located, determine a folder indicated by the folder icon as a target folder, and save the first file into the target folder. Therefore, after viewing, editing, and performing other processing on the file content of the first file in the first application displayed in the first display area, the first file may be directly saved to the target folder in the file management interface displayed in the second display area, thereby realizing the group management of the first file as required by the user.

Of course, the way of processing the first file based on the displayed file identifier may not be limited herein. For example, the processing of the first file may also include editing the file content of the first file. In a case where the second interface is also an editing interface for the file content, multiple applications may collaborate to edit the file content of the first file.

In some implementations, considering that the user may need to re-determine the file content of the first file before processing the first file based on the displayed file identifier, the electronic device may also display a preview image of the file content in the second interface.

Figure 18:
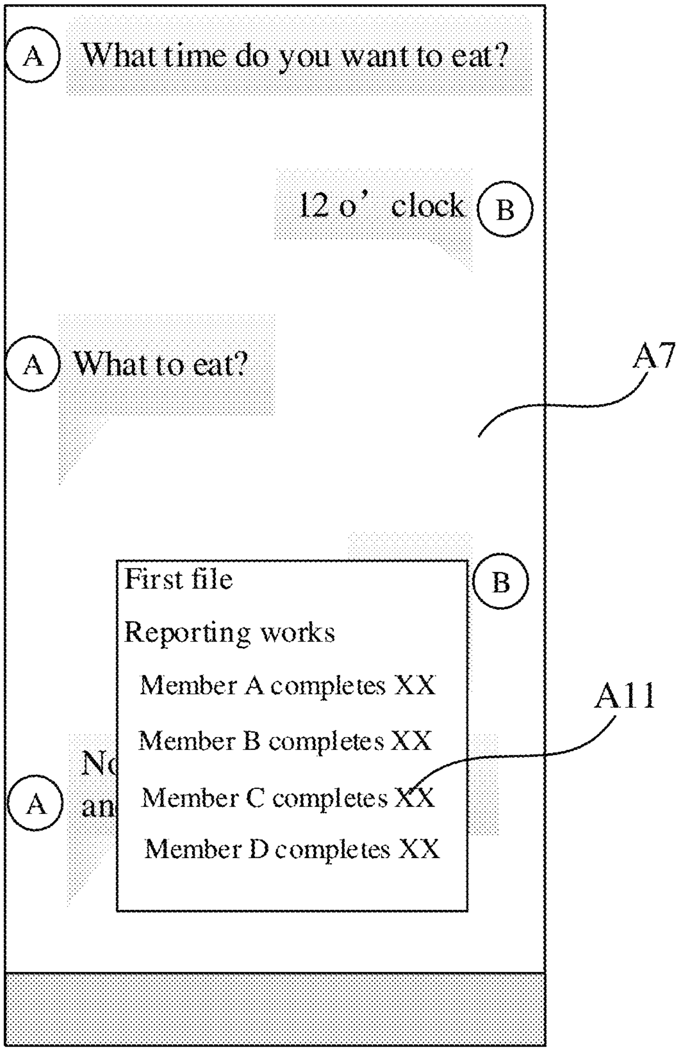
FIG. 18 is a schematic diagram illustrating an interface provided in the embodiments of the present disclosure.

In a possible implementation, after the electronic device displays the file identifier of the first file in the second interface, if a fifth operation performed on the file identifier is detected, a preview image of the file content of the first file may also be displayed in the second interface. For example, as illustrated in FIG. 18, the first file may be a text document, and the second interface may be a chat interface A7, and a preview image A11 of the text content of the text document may be displayed in the chat interface A7.

In another possible implementation, after the electronic device displays the file identifier of the first file in the second interface, if a preset sliding operation is detected, it may also display a preview image of the file content of the first file in the second interface in response to the preset sliding operation. A sliding condition satisfied by the preset sliding operation may not be limited here. For example, the preset sliding operation may be a sliding operation from an edge of the second screen to one side.

It is notable that, when the electronic device is an electronic device with an inward-folding screen as described above, the first display area may be located on the second screen, and the second display area may be located on the first screen. In this case, in response to detecting the first control operation that changes the first screen from being in the folded state to being in the unfolded state, the file identifier of the first file may be displayed in the second interface displayed in the second display area of the first screen.

The file processing method provided in this embodiment of the present disclosure is for an electronic device with an inward-folding screen, the electronic device includes a first screen and a second screen, and the first screen is a foldable screen. When the first screen is in a folded state, a second interface of a second application is displayed in a second display area of the second screen. After the first screen is changed from being in the folded state to being in an unfolded state, a first interface of a first application is displayed in a first display area of the first screen. After the user uses the first application to view, edit, or perform other processing on the file content of the first file, in response to a first control operation that changes the first screen from being in the unfolded state to being in folded state, a file identifier of the first file is displayed in the second interface displayed in the second display area, so that the user may process the first file based on the displayed file identifier. In this way, the first screen and the second screen may be fully utilized, so that the content displayed on the first screen is linked with the content displayed on the second screen, which reduces the operations in the file processing process, facilitate the user to process files, and improve the operational convenience.

Figure 19:
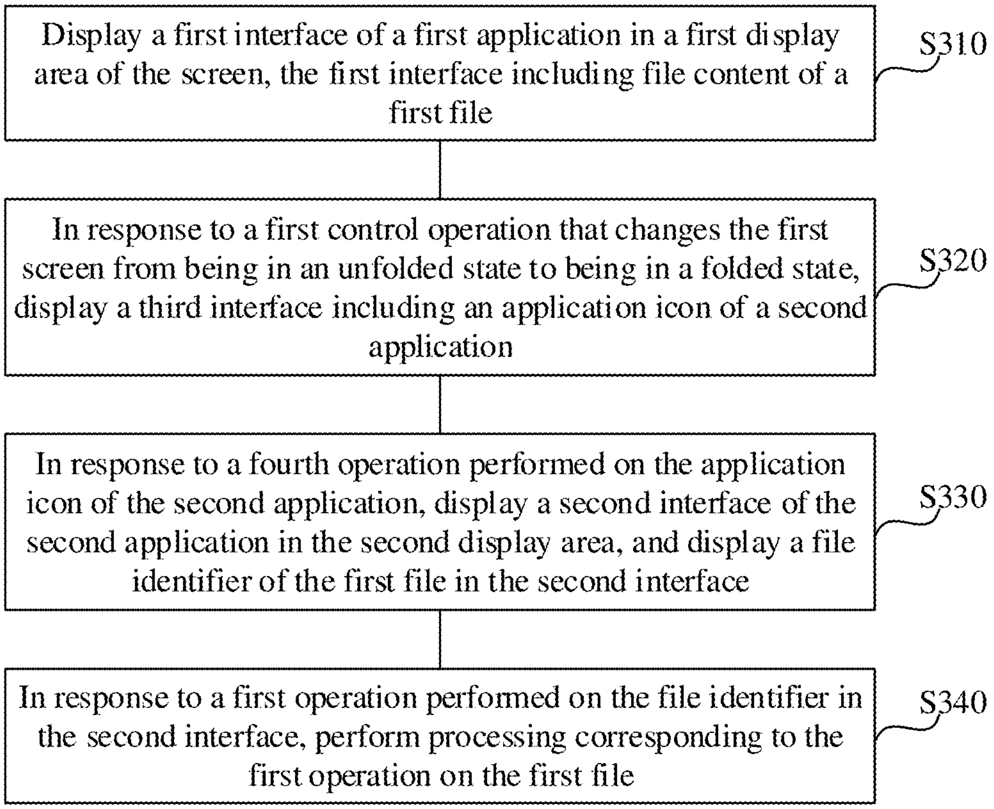
FIG. 19 is a flow chart of a file processing method according to a further embodiment of the present disclosure.

As illustrated in FIG. 19, a flowchart of a file processing method provided in a further embodiment of the present disclosure is shown. The file processing method is applied to the above electronic device. The process illustrated in FIG. 19 is described in detail below. The file processing method may specifically include operations S310-S340 as follows.

At block S310, a first interface of a first application is displayed in a first display area of the screen, the first interface including file content of a first file.

The electronic device may be an electronic device with an inward-folding screen, for example on as illustrated in FIG. 1 and FIG. 2. The screen of the electronic device 100 includes a first screen 131 and a second screen 132. The first screen 131 is a foldable screen, and the size of the first screen 131 is larger than the size of the second screen 132. The first display area is located on the first screen 131, and the second display area is located on the second screen 132. When the first screen 131 is in the folded state, content may be displayed through the second screen 132.

At block S320, in response to a first control operation that changes the first screen from being in an unfolded state to being in a folded state, a third interface is displayed in a second display area of the second screen, the third interface including an application icon of a second application.

In the embodiment of the present disclosure, unlike the aforementioned embodiment, before the first interface is displayed in the first display area of the first screen, the second interface of the second application is not displayed in the second display area of the second screen. Therefore, in response to detecting the first control operation that changes the first screen from being in the unfolded state to being in the folded state, the third interface including the application icon of the second application, such as a main interface of the electronic device, may be displayed.

At block S330, in response to a fourth operation performed on the application icon of the second application, a second interface of the second application is displayed in the second display area, and a file identifier of the first file is displayed in the second interface.

While the third interface is displayed, an operation(s) performed in the third interface may be detected. In response to detecting the fourth operation, such as a click operation, performed on the application icon of the second application, the second interface of the second application may be displayed in the second display area, and the file identifier of the first file may be displayed in the second interface. That is to say, in the embodiment of the present disclosure, in a case where the second interface of the second application is not displayed at first through the second screen, the first interface of the first application may be first displayed in the first display area of the first screen; after the user performs the corresponding processing on the file content of the first file based on the displayed first interface, the first screen is controlled to be in the folded state, and the second application is started through the second screen, so that the file identifier of the first file can be displayed in the second interface while the second interface is displayed in the second display area of the second screen.

In some implementations, when the electronic device displays the third interface in response to the first control operation that changes the first screen from being in the unfolded state to being in the folded state, the file identifier of the first file may also be simultaneously displayed in the third interface to prompt the user to open a corresponding application in the interface of the second screen to process the first file. As such, the user may input the fourth operation for the application icon of the second application, based on the displayed file identifier. In response to detecting the fourth operation, the electronic device may display the second interface of the second application in the second display area, and continue to display the file identifier in the second interface.

At block S340, in response to a first operation performed on the file identifier in the second interface, processing corresponding to the first operation is performed on the first file.

In the embodiment of the present disclosure, operation S340 may refer to the contents of other embodiments, which will not be repeated here.

The file processing method provided in this embodiment of the present disclosure is for an electronic device with an inward-folding screen, the electronic device includes a first screen and a second screen, and the first screen is a foldable screen. A first interface of a first application is displayed in a first display area of the first screen, so that the user may view, edit, and perform other operations on the file content of a first file through the first application. Then, in response to a first control operation that changes the first screen from being in the unfolded state to being in the folded state, a third interface is displayed in the second display area. Then, in response to a fourth operation performed on an application icon of a second application in the third interface, a second interface of the second application is displayed in the second display area, and a file identifier of the first file is displayed in the second interface, so that the user may process the first file based on the displayed file identifier. In this way, the first screen and the second screen can be fully utilized, so that the content displayed on the first screen is linked with the content displayed on the second screen, which reduces the operations in the file processing process, facilitates the user to process files, and improves the operational convenience.

Figure 20:
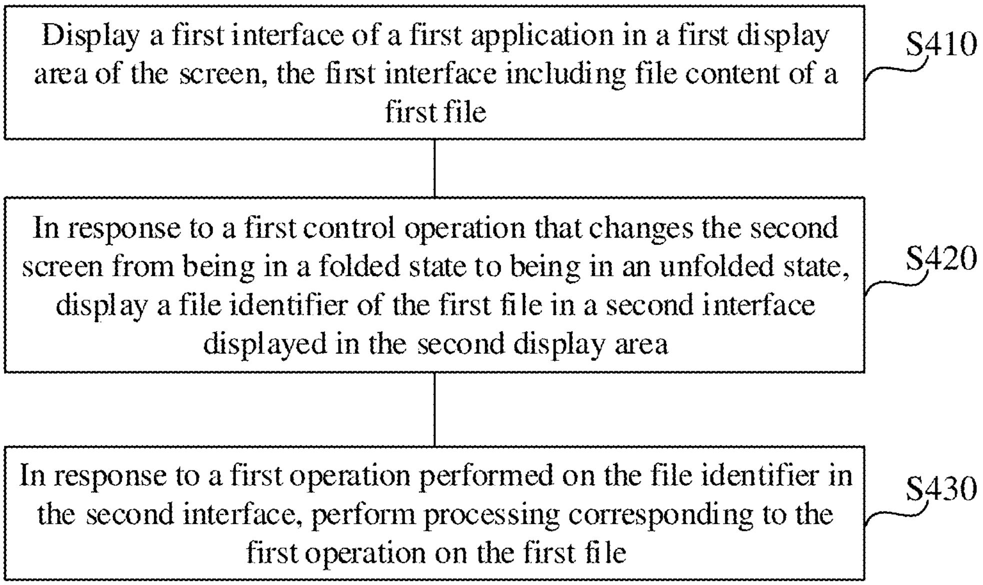
FIG. 20 is a flow chart of a file processing method according to yet a further embodiment of the present disclosure.

As illustrated in FIG. 20, a flow chart of a file processing method provided in yet a further embodiment of the present disclosure is shown. The file processing method is applied to the above electronic device. The process illustrated in FIG. 20 is described in detail below. The file processing method may specifically include operations S410-S430 as follows.

At block S410, a first interface of a first application is displayed in a first display area of the screen, the first interface including file content of a first file.

In the embodiment of the present disclosure, the screen includes a first screen and a second screen, the first display area is located on the first screen, and the second display area is located on the second screen. The second screen is a foldable screen. Different from the electronic device with an inward-folding screen provided in the aforementioned embodiments, the second screen is a foldable screen in the embodiment of the present disclosure. When the second screen is in a folded state, the electronic device displays content through the first screen, and the first display area of the first screen may display the first interface.

At block S420, in response to a first control operation that changes the second screen from being in a folded state to being in an unfolded state, a file identifier of the first file is displayed in a second interface displayed in the second display area, the second interface being an interface of a second application.

In the embodiment of the present disclosure, when the first control operation that changes the second screen from being in the folded state to being in the unfolded state is detected, it needs to display content through the second screen at this time. The electronic device may display the file identifier of the first file in the second interface displayed in the second display area, in response to the first control operation that changes the second screen from being in the folded state to being in the unfolded state. Thus, it is possible to display the first interface in the non-foldable first screen, so that the user may process the file content of the first file in the non-foldable first screen. Then, the second interface is displayed through the second screen in the unfolded state, and the file identifier of the first file is displayed in the second interface, so that the user may process the first file based on the displayed file identifier.

At block S430, in response to a first operation performed on the file identifier in the second interface, processing corresponding to the first operation is performed on the first file.

In the embodiment of the present disclosure, operation S430 may refer to the contents of other embodiments, which will not be repeated here.

The file processing method provided in this embodiment of the present disclosure can make full use of the two screens of the electronic device with an inward-folding screen, so that the content displayed on the first screen is linked with the content displayed on the second screen, which reduces the operations in the file processing process, facilitates the user to process files, and improves the operational convenience.

Figure 21:
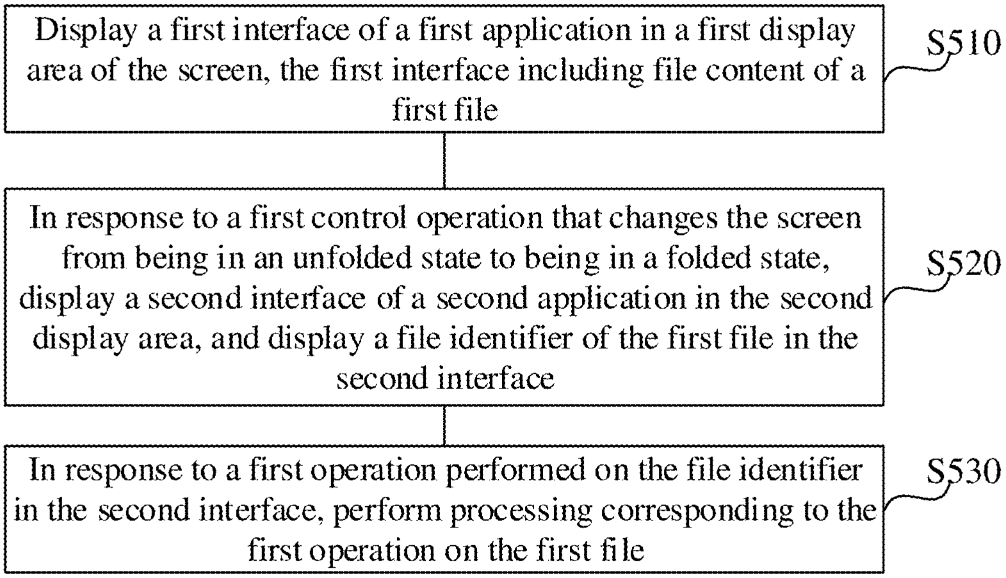
FIG. 21 is a flow chart of a file processing method according to yet a still further embodiment of the present disclosure.

As illustrated in FIG. 21, a flow chart of a file processing method provided in yet a still further embodiment of the present disclosure is shown. The file processing method is applied to the above electronic device. The process illustrated in FIG. 21 is described in detail below. The file processing method may specifically include operations S510-S530 as follows.

At block S510, a first interface of a first application is displayed in a first display area of the screen, the first interface including file content of a first file.

The electronic device may be an electronic device with an outward-folding screen, for example one illustrated in FIG. 3 and FIG. 4. The screen 130 of the electronic device 100 is a foldable screen, the first display area is the entire display area obtained when the screen 130 is in an unfolded state, and the second display area is a partial display area obtained when the screen 130 is in a folded state. In the embodiment of the present disclosure, when the screen is in the unfolded state, the first display area may be controlled to be in a screen-on state, and the electronic device may display the first interface in the first display area, so that the user may process the file content of the first file based on the displayed first interface.

At block S520, in response to a first control operation that changes the screen from being in an unfolded state to being in a folded state, a second interface of a second application is displayed in the second display area, and a file identifier of the first file is displayed in the second interface.

In the embodiment of the present disclosure, when the screen of the electronic device is in the folded state, the second display area may be controlled to be in a screen-on state, and the display areas of the screen other than the second display area are in a screen-off state. When the screen of the electronic device is in the folded state and the unfolded state, the interfaces of different applications may be displayed respectively. After the first interface is displayed through the first display area, in response to detecting the first control operation that changes the first screen from being in the unfolded state to being in the folded state, the file identifier of the first file may be displayed in the second interface displayed in the second display area, so that the user may process the first file based on the file identifier. It may be understood that, after the user completes the required processing on the file content of the first file in the first interface displayed in the first display area, if it needs to further process the processed first file in the second interface of the second application, the screen may be controlled to be in the folded state so that the screen then displays the second interface of the second application, and the electronic device displays the file identifier of the first file in the second interface, which enables the user to process the first file based on the displayed file identifier.

At block S530, in response to a first operation performed on the file identifier in the second interface, processing corresponding to the first operation is performed on the first file.

In the embodiment of the present disclosure, operation S530 may refer to the contents of the aforementioned embodiment, which will not be repeated here.

It is notable that, when the electronic device is the above-mentioned electronic device with an outward-folding screen, the first display area may be a partial display area of the screen, and the second display area may be the entire display area of the screen. In this case, in response to the first control operation that changes the first screen from being in the folded state to being in the unfolded state, the file identifier of the first file may be displayed in the second interface displayed in the second display area.

In a case where the electronic device is an electronic device with a push-pull screen as mentioned above, for example a push-pull electronic device as illustrated in FIG. 5 and FIG. 6, the above embodiment may also be referred. Unlike the electronic device with an outward-folding screen, the electronic device with a push-pull screen controls the screen to display the interface contents of different applications by controlling the screen to expand or retract. Specifically, the first display area may be the entire display area of the screen, and the second display area may be a partial display area of the screen. When the screen is in an expanded/unfolded state, the first interface of the first application may be displayed in the first display area of the screen, and the first interface includes the file content of the first file. In response to a first control operation that changes the screen from being in the expanded state to being in a contracted/folded state, the second interface of the second application is displayed in the second display area, and the file identifier of the first file is displayed in the second interface. In response to a first operation performed on the file identifier in the second interface, the first file is processed.

With the file processing method provided in the embodiment of the present disclosure, the characteristics of an electronic device with an outward-folding screen can be fully utilized, so that the content displayed on the screen of the electronic device in the folded state is linked with the content displayed in the unfolded state, which reduces the operations in the file processing process, facilitates the user to process files, and improves the operational convenience.

Figure 22:
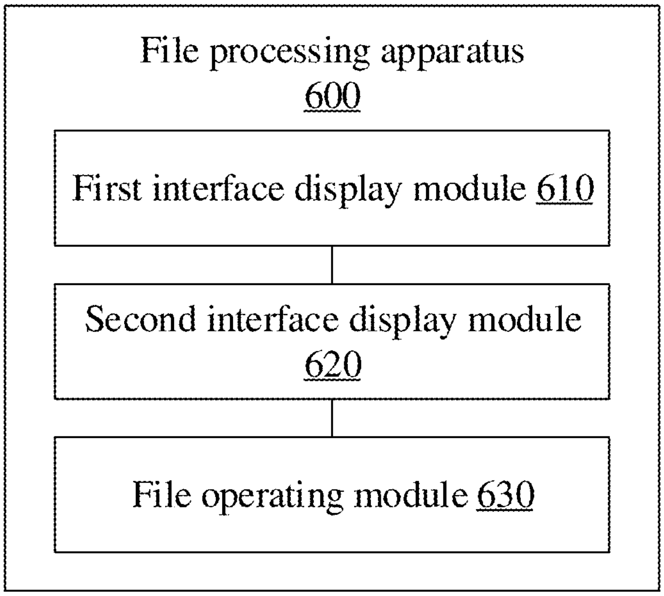
FIG. 22 is a block diagram of a file processing apparatus according to an embodiment of the present disclosure.

As illustrated in FIG. 22, a structural block diagram of a file processing apparatus 600 provided in an embodiment of the present disclosure is shown. The file processing apparatus 600 is implemented in the above-mentioned electronic devices, and the file processing apparatus 600 includes a first interface display module 610, a second interface display module 620 and a file operating module 630. The first interface display module 610 is configured to display a first interface of a first application in a first display area of the screen, where the first interface includes file content of a first file. The second interface display module 620 is configured to, in response to a first control operation, display a file identifier of the first file in a second interface displayed in the second display area of the screen, where the second interface is an interface of a second application. The file operating module 630 is configured to, in response to a first operation performed on the file identifier in the second interface, perform processing corresponding to the first operation on the first file.

In some embodiments, the screen includes a first screen and a second screen, the first display area is located on the first screen, the second display area is located on the second screen, and the first screen is a foldable screen. The second interface display module 620 is configured to display the file identifier of the first file in the second interface displayed in the second display area, in response to a first control operation that changes the first screen from being in an unfolded state to being in a folded state.

In a possible implementation, the second interface display module 620 may further be configured to, in response to a second operation for the second application, display the second interface of the second application in the second display area when the first screen is in the folded state, before the first interface of the first application is displayed in the first display area of the screen. The first interface display module 610 is configured to, after the first screen is changed from being in the folded state to being in the unfolded state, display the first interface of the first application in the first display area, in response to a third operation for the first application.

In a possible implementation, the file processing apparatus 600 may further include a screen control module. The screen control module is configured to control the second screen to be in a screen-off state when the first screen is changed from being in the folded state to being in the unfolded state. The second interface display module 620 may be specifically configured to: in response to the first control operation, control the second screen to be in a screen-on state, display the second interface, based on content displayed on the second screen before getting into the screen-off state, and display the file identifier of the first file in the second interface.

In a possible implementation, the second interface display module 620 may be specifically configured to: display a third interface in response to the first control operation, where the third interface includes an application icon of the second application; and in response to a fourth operation performed on the application icon of the second application, display the second interface of the second application in the second display area, and display the file identifier of the first file in the second interface.

In some implementations, the screen includes a first screen and a second screen, the first display area is located on the first screen, the second display area is located on the second screen, and the second screen is a foldable screen. The second interface display module 620 may be specifically configured to: in response to a first control operation that changes the second screen from being in a folded state to being in an unfolded state, display the file identifier of the first file in the second interface displayed in the second display area.

In some implementations, the screen is a foldable screen, the first display area is the entire display area of the screen, and the second display area is a partial display area of the screen. The second interface display module 620 may be specifically configured to: in response to a first control operation that changes the screen from being in an unfolded state to being in a folded state, display the second interface of the second application in the second display area, and display the file identifier of the first file in the second interface.

In some implementations, the file processing apparatus 600 may further include a file editing module. The file editing module is configured to, before the file identifier of the first file is displayed, in response to the first control operation, in the second interface displayed in the second display area of the screen, edit the file content in response to an editing operation for the file content, so as to obtain the edited first file.

In some implementations, the second interface is a chat interface of a chat application, and the file operating module 630 may be configured to send the first file in response to a first drag operation performed on the file identifier in the chat interface.

In a possible implementation, the file operating module 630 may be specifically configured to: in response to the first drag operation performed on the file identifier in the chat interface, obtain the end position of the first drag operation; when the end position is located in a first preset area of the chat interface, send the first file; and when the end position is located in a second preset area of the chat interface, cancel the displaying of the file identifier.

In some implementations, the second interface is a file management interface of a file management application, and the file operating module 630 may be configured to save the first file to a target folder in response to a second drag operation performed on the file identifier in the file management interface.

In some implementations, the file processing apparatus 600 may further include a content preview module. The content preview module is configured to, after the file identifier of the first file is displayed, in response to the first control operation, in the second interface displayed in the second display area of the screen, display a preview image of the file content of the first file in the second interface in response to a fifth operation performed on the file identifier in the second interface.

Those skilled in the art may clearly understand that, for the convenience and brevity of description, the specific working processes of the apparatus and modules may refer to the corresponding processes in the aforementioned method embodiments, which will not be repeated here.

In several embodiments provided in the present disclosure, the coupling between the modules may be electrical, mechanical or in other forms.

In addition, the individual functional modules in each embodiment of the present disclosure may be integrated into one processing module, or each module may exist physically separately, or two or more modules may be integrated into one module. The integrated module may be implemented in hardware or in software functional modules.

To summarize, in the solutions provided by the present disclosure, a first interface of a first application is displayed in a first display area of a screen, the first interface including file content of a first file. In response to a first control operation, the file identifier of the first file is displayed in a second interface displayed in a second display area of the screen, the second interface being an interface of a second application. In response to a first operation performed on the file identifier in the second interface, processing corresponding to the first operation is performed on the first file. In this way, the linkage between applications can be enriched and the operations in the file processing process can be reduced, which facilitates the user to process files and improves the operational convenience.

Figure 23:
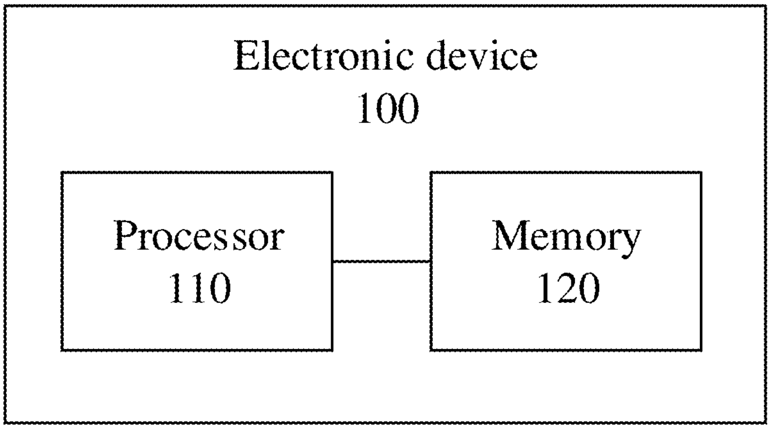
FIG. 23 is a block diagram of an electronic device according to an embodiment of the present disclosure, the electronic device is used to implement the file processing methods according to the embodiments of the present disclosure.

As illustrated in FIG. 23, a structural block diagram of an electronic device provided in an embodiment of the present disclosure is shown. The electronic device 100 may be a smart phone, a tablet computer, an e-book, or other electronic devices capable of running applications. The electronic device 100 in the present disclosure may include one or more of a processor 110, a memory 120, and one or more application programs. The one or more application programs may be stored in the memory 120 and executed by one or more processors 110, and the one or more application programs are configured to execute the methods as described in the aforementioned method embodiments.

The processor 110 may include one or more processing cores. The processor 110 uses various interfaces and lines to connect various parts within the entire electronic device 100, and performs various functions of the electronic device 100 and processes data by running or executing instructions, programs, code sets or instruction sets stored in the memory 120, and calling data stored in the memory 120. Optionally, the processor 110 may be implemented in at least one hardware of digital signal processor (DSP), field-programmable gate array (FPGA), and programmable logic array (PLA). The processor 110 may integrate one or a combination of a central processing unit (CPU), a graphics processing unit (GPU), a modem, and the like. The CPU mainly processes the operating system, user interface and applications. The GPU is responsible for rendering and drawing display content. The modem is used to handle wireless communications. It is understandable that the modem may not be integrated into the processor 110, but may be implemented separately through a communication chip.

The memory 120 may include a random access memory (RAM) or a read-only memory (ROM). The memory 120 may be used to store instructions, programs, codes, code sets, or instruction sets. The memory 120 may include a program storage area and a data storage area. The program storage area may store instructions for implementing an operating system, instructions for implementing at least one function (such as a touch function, a sound playback function, and an image playback function), instructions for implementing the method embodiments, etc. The data storage area may also store data created by the electronic device 100 during use (such as a phone book, audio and video data, and chat record data).

Figure 24:
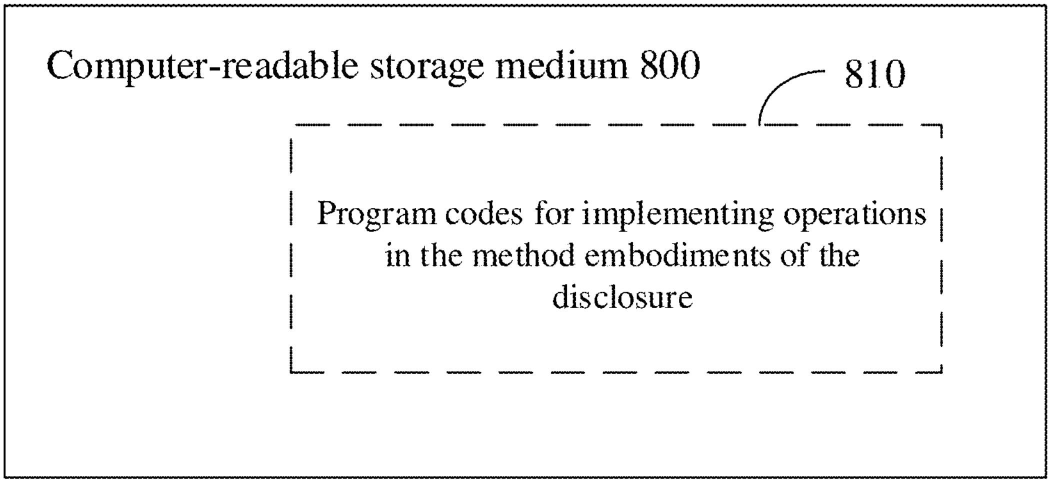
FIG. 24 is a storage unit for storing or carrying program codes according to an embodiment of the present disclosure, the program codes are used to implement the file processing methods according to the embodiments of the present disclosure.

As illustrated in FIG. 24, a structural block diagram of a computer-readable storage medium provided in an embodiment of the present disclosure is shown. The computer-readable medium 800 stores program codes which may be called by a processor to execute the methods described in the above method embodiments.

The computer-readable storage medium 800 may be an electronic memory such as a flash memory, an Electrically Erasable Programmable Read Only Memory (EEPROM), an EPROM, a hard disk, or a ROM. Optionally, the computer-readable storage medium 800 includes a non-transitory computer-readable storage medium. The computer-readable storage medium 800 has a storage space for program codes 810 for executing any method operations in the above-described methods. The program codes may be read from or written into one or more computer program products. The program codes 810 may be compressed for example in a suitable form.

Finally, it is notable that the above embodiments are only used to illustrate the technical solutions of the present disclosure, rather than to limit it. Although the present disclosure has been described in detail with reference to the aforementioned embodiments, those skilled in the art should understand that they may still modify the technical solutions described in the aforementioned embodiments, or make equivalent replacements for some of the technical features therein. However, these modifications or replacements do not cause the essence of the corresponding technical solutions to deviate from the spirit and scope of the technical solutions of the embodiments of the present disclosure.

What is claimed is:

1. A file processing method, for an electronic device, wherein the electronic device comprises a screen, the screen comprises a first screen and a second screen, the first screen is a foldable screen, and the method comprises:

displaying a first interface of a first application in a first display area located on the first screen, the first interface comprising file content of a first file;

in response to a first control operation that changes the first screen from being in an unfolded state to being in a folded state, displaying a file identifier of the first file in a second interface displayed in a second display area located on the second screen, the second interface being an interface of a second application; and in response to a first operation performed on the file identifier in the second interface, performing, on the first file, processing corresponding to the first operation;

wherein before displaying the first interface of the first application in the first display area, the method further comprises:

while the first screen is in the folded state, in response to a second operation for the second application, displaying the second interface of the second application in the second display area;

wherein the method further comprises:

after the first screen is changed from being in the folded state to being in the unfolded state, controlling the second screen to be in a screen-off state, and saving a display status of the second screen;

wherein the displaying the first interface of the first application in the first display area comprises:

after the first screen is changed from being in the folded state to being in the unfolded state, in response to a third operation for the first application, displaying the first interface of the first application in the first display area, and displaying a prompt message in the first interface, wherein the prompt message is used to prompt that the display status of the second screen has been saved.

2. The method as claimed in claim 1, wherein the displaying the file identifier of the first file in the second interface displayed in the second display area, in response to the first control operation that changes the first screen from being in the unfolded state to being in the folded state, comprises:

in response to the first control operation that changes the first screen from being in the unfolded state to being in the folded state, controlling the second screen to be in a screen-on state; and displaying the second interface, based on content displayed on the second screen before getting into the screen-off state, and displaying the file identifier of the first file in the second interface.

3. The method as claimed in claim 2, wherein the displaying the second interface, based on the content displayed on the second screen before getting into the screen-off state, comprises:

displaying the second interface by controlling the second screen to display, based on the saved display status of the second screen, the content displayed on the second screen before getting into the screen-off state.

4. The method as claimed in claim 3, wherein the controlling the second screen to be in the screen-on state in response to the first control operation that changes the first screen from being in the unfolded state to being in the folded state, comprises:

in response to the first control operation that changes the first screen from being in the unfolded state to being in the folded state, controlling the second screen to be in the screen-on state, controlling the first screen to be in a screen-off state, and saving a display status of the first screen; and the method further comprises:

in response to a second control operation that changes the first screen from being in the folded state to being in the unfolded state, controlling the first screen to display, based on the saved display status of the first screen, content displayed on the first screen before getting into the screen-off state.

5. The method as claimed in claim 1, wherein the displaying the file identifier of the first file in the second interface displayed in the second display area in response to the first control operation that changes the first screen from being in the unfolded state to being in the folded state, comprises:

in response to the first control operation that changes the first screen from being in the unfolded state to being in the folded state, displaying a third interface comprising an application icon of the second application; and in response to a fourth operation performed on the application icon of the second application, displaying the second interface of the second application in the second display area, and displaying the file identifier of the first file in the second interface.

6. The method as claimed in claim 1, wherein before displaying the file identifier of the first file in the second interface displayed in the second display area located on the second screen in response to the first control operation, the method further comprises:

in response to an editing operation performed on the file content, editing the file content and obtaining an edited first file.

7. The method as claimed in claim 1, wherein the second interface is a chat interface of a chat application, and the performing, on the first file, the processing corresponding to the first operation in response to the first operation performed on the file identifier in the second interface, comprises:

in response to a first drag operation performed on the file identifier in the chat interface, sending the first file.

8. The method as claimed in claim 7, wherein the sending the first file in response to the first drag operation performed on the file identifier in the chat interface, comprises:

in response to the first drag operation performed on the file identifier in the chat interface, obtaining an end position of the first drag operation; and in response to the end position being located in a first preset area of the chat interface, sending the first file.

9. The method as claimed in claim 8, wherein the first preset area comprises an area where an object identifier of a chat object is located, and the sending the first file in response to the end position being located in the first preset area of the chat interface, comprises:

in response to the end position being located in an area of the chat interface where a target object identifier is located, obtaining a target chat object corresponding to the target object identifier; and sending the first file to the target chat object.

10. The method as claimed in claim 8, wherein after obtaining the end position of the first drag operation, the method further comprises:

in response to the end position being located in a second preset area of the chat interface, canceling the displaying of the file identifier.

11. The method as claimed in claim 1, wherein the second interface is a file management interface of a file management application, and the performing, on the first file, the processing corresponding to the first operation in response to the first operation performed on the file identifier in the second interface, comprises:

in response to a second drag operation performed on the file identifier in the file management interface, saving the first file to a target folder.

12. The method as claimed in claim 1, wherein after displaying the file identifier of the first file in the second interface displayed in the second display area located on the second screen in response to the first control operation, the method further comprises:

in response to a fifth operation performed on the file identifier in the second interface, displaying a preview image of the file content of the first file in the second interface.

13. The method as claimed in claim 1, further comprising:

enabling a dual desktop mode of the electronic device in which the first screen and the second screen are capable of displaying interfaces of two applications thereon respectively.

14. An electronic device, comprising:

one or more processors;

a memory; and one or more programs, wherein the one or more programs are stored in the memory and configured to be executed by the one or more processors to:

display a first interface of a first application in a first display area of a screen of the electronic device, the first interface comprising file content of a first file, the screen comprising a first screen and a second screen, the first screen being a foldable screen, and the first display area being located on the first screen;

in response to a first control operation that changes the first screen from being in an unfolded state to being in a folded state, display a file identifier of the first file in a second interface displayed in a second display area located on the second screen, the second interface being an interface of a second application; and in response to a first operation performed on the file identifier in the second interface, perform, on the first file, processing corresponding to the first operation;

wherein the one or more programs are further executed by the one or more processors to:

while the first screen is in the folded state, in response to a second operation for the second application, display the second interface of the second application in the second display area;

after the first screen is changed from being in the folded state to being in the unfolded state, control the second screen to be in a screen-off state, and save a display status of the second screen; and after the first screen is changed from being in the folded state to being in the unfolded state, in response to a third operation for the first application, display the first interface of the first application in the first display area, and display a prompt message in the first interface, wherein the prompt message is used to prompt that the display status of the second screen has been saved.

15. The electronic device as claimed in claim 14, wherein the one or more programs are further executed by the one or more processors to:

in response to the first control operation that changes the first screen from being in the unfolded state to being in the folded state, control the second screen to be in a screen-on state; and display the second interface by controlling the second screen to display, based on the saved display status of the second screen, the content displayed on the second screen before getting into the screen-off state, and display the file identifier of the first file in the second interface.

16. The electronic device as claimed in claim 15, wherein the one or more programs are further executed by the one or more processors to:

in response to the first control operation that changes the first screen from being in the unfolded state to being in the folded state, control the first screen to be in a screen-off state, and save a display status of the first screen; and in response to a second control operation that changes the first screen from being in the folded state to being in the unfolded state, control the first screen to display, based on the saved display status of the first screen, content displayed on the first screen before getting into the screen-off state.

17. The electronic device as claimed in claim 14, wherein the one or more programs are further executed by the one or more processors to:

in response to the first control operation that changes the first screen from being in the unfolded state to being in the folded state, display a third interface comprising an application icon of the second application; and in response to a fourth operation performed on the application icon of the second application, display the second interface of the second application in the second display area, and display the file identifier of the first file in the second interface.

18. The electronic device as claimed in claim 14, wherein the one or more programs are further executed by the one or more processors to:

before the file identifier of the first file is displayed, in response to the first control operation, in the second interface displayed in the second display area, in response to an editing operation performed on the file content, edit the file content and obtain an edited first file; and after the file identifier of the first file is displayed, in response to the first control operation, in the second interface displayed in the second display area, in response to a fifth operation performed on the file identifier in the second interface, display a preview image of the file content of the first file in the second interface.

19. A non-transitory computer-readable storage medium having program codes stored thereon, wherein the program codes are invokable by a processor to:

display a first interface of a first application in a first display area of a screen of an electronic device, the first interface comprising file content of a first file, the screen comprising a first screen and a second screen, the first screen being a foldable screen, and the first display area being located on the first screen;

in response to a first control operation that changes the first screen from being in an unfolded state to being in a folded state, display a file identifier of the first file in a second interface displayed in a second display area located on the second screen, the second interface being an interface of a second application; and in response to a first operation performed on the file identifier in the second interface, perform, on the first file, processing corresponding to the first operation;

wherein the program codes are further invokable by the processor to:

while the first screen is in the folded state, in response to a second operation for the second application, display the second interface of the second application in the second display area;

after the first screen is changed from being in the folded state to being in the unfolded state, control the second screen to be in a screen-off state, and save a display status of the second screen; and after the first screen is changed from being in the folded state to being in the unfolded state, in response to a third operation for the first application, display the first interface of the first application in the first display area, and display a prompt message in the first interface, wherein the prompt message is used to prompt that the display status of the second screen has been saved.

20. The non-transitory computer-readable storage medium as claimed in claim 19, wherein the program codes are further invokable by the processor to:

in response to the first control operation that changes the first screen from being in the unfolded state to being in the folded state, control the second screen to be in a screen-on state; and display the second interface by controlling the second screen to display, based on the saved display status of the second screen, the content displayed on the second screen before getting into the screen-off state, and display the file identifier of the first file in the second interface.

* * * * *